US010884968B2

(12) United States Patent
Adiletta et al.

(10) Patent No.: US 10,884,968 B2
(45) Date of Patent: *Jan. 5, 2021

(54) TECHNOLOGIES FOR FLEXIBLE PROTOCOL ACCELERATION

(71) Applicant: Intel Corporation, Santa Clara, CA (US)

(72) Inventors: Matthew J. Adiletta, Bolton, MA (US); Bradley Burres, Waltham, MA (US); Duane Galbi, Cambridge, MA (US); Amit Kumar, Malborough, MA (US); Yadong Li, Portland, OR (US); Salma Mirza, Santa Clara, CA (US); Jose Niell, Franklin, MA (US); Thomas E. Willis, Portland, OR (US); William Duggan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/366,496

(22) Filed: Mar. 27, 2019

(65) Prior Publication Data

US 2020/0073846 A1 Mar. 5, 2020

(51) Int. Cl.
*G06F 13/42* (2006.01)
*G06F 8/60* (2018.01)

(52) U.S. Cl.
CPC .............. *G06F 13/42* (2013.01); *G06F 8/60* (2013.01)

(58) Field of Classification Search
CPC ................................ G06F 13/42; G06F 8/60
See application file for complete search history.

(56) References Cited

U.S. PATENT DOCUMENTS

| | | | |
|---|---|---|---|
| 9,996,484 B1 | 6/2018 | Davis | |
| 10,212,138 B1* | 2/2019 | Diamant | ............... H04L 9/0877 |
| 2010/0241694 A1* | 9/2010 | Jensen | .................... H04L 69/24 |
| | | | 709/203 |
| 2015/0177994 A1 | 6/2015 | Vucinic | |
| 2019/0065426 A1* | 2/2019 | Das Sharma | ....... G06F 13/4282 |

OTHER PUBLICATIONS

Extended European search report for European patent application No. 20161950.9, dated Jul. 24, 2020 (12 pages).

* cited by examiner

*Primary Examiner* — Henry Tsai
*Assistant Examiner* — Christopher A Daley
(74) *Attorney, Agent, or Firm* — Schwabe, Williamson & Wyatt, P.C.

(57) ABSTRACT

Technologies for flexible I/O protocol acceleration include a computing device having a root complex, a smart endpoint coupled to the root complex, and an offload complex coupled to the smart endpoint. The smart endpoint receives an I/O transaction that originates from the root complex and parses the I/O transaction based on an I/O protocol and identifies an I/O command. The smart endpoint may parse the I/O transaction based on endpoint firmware that may be programmed by the computing device. The smart endpoint accelerates the I/O command and provides a smart context to the offload complex. The smart endpoint may copy the I/O command to memory of the smart endpoint or the offload complex. The smart endpoint may identify protocol data based on the I/O command and copy the protocol data to the memory of the smart endpoint or the offload complex. Other embodiments are described and claimed.

25 Claims, 21 Drawing Sheets

TECHNOLOGIES FOR FLEXIBLE PROTOCOL ACCELERATION

BACKGROUND

Typical PCI Express (PCIe) I/O devices include a fixed function endpoint. The fixed function endpoint typically includes an endpoint transaction layer, a hardware base configuration space, and an endpoint interface to the other parts of the I/O device. The endpoint may also include fixed function protocol conversion. The PCIe device may also include hardware switches, bridges, or other components that establish a fixed PCI hierarchy.

Current computing systems may share computing resources such as disk drives or other storage devices among multiple tenants using software virtualization, typically performed by a virtual machine monitor, hypervisor, or virtualized guest software executed by a host processor. Some computing systems may support bare metal virtualization by offloading certain virtualization tasks to an offload complex.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
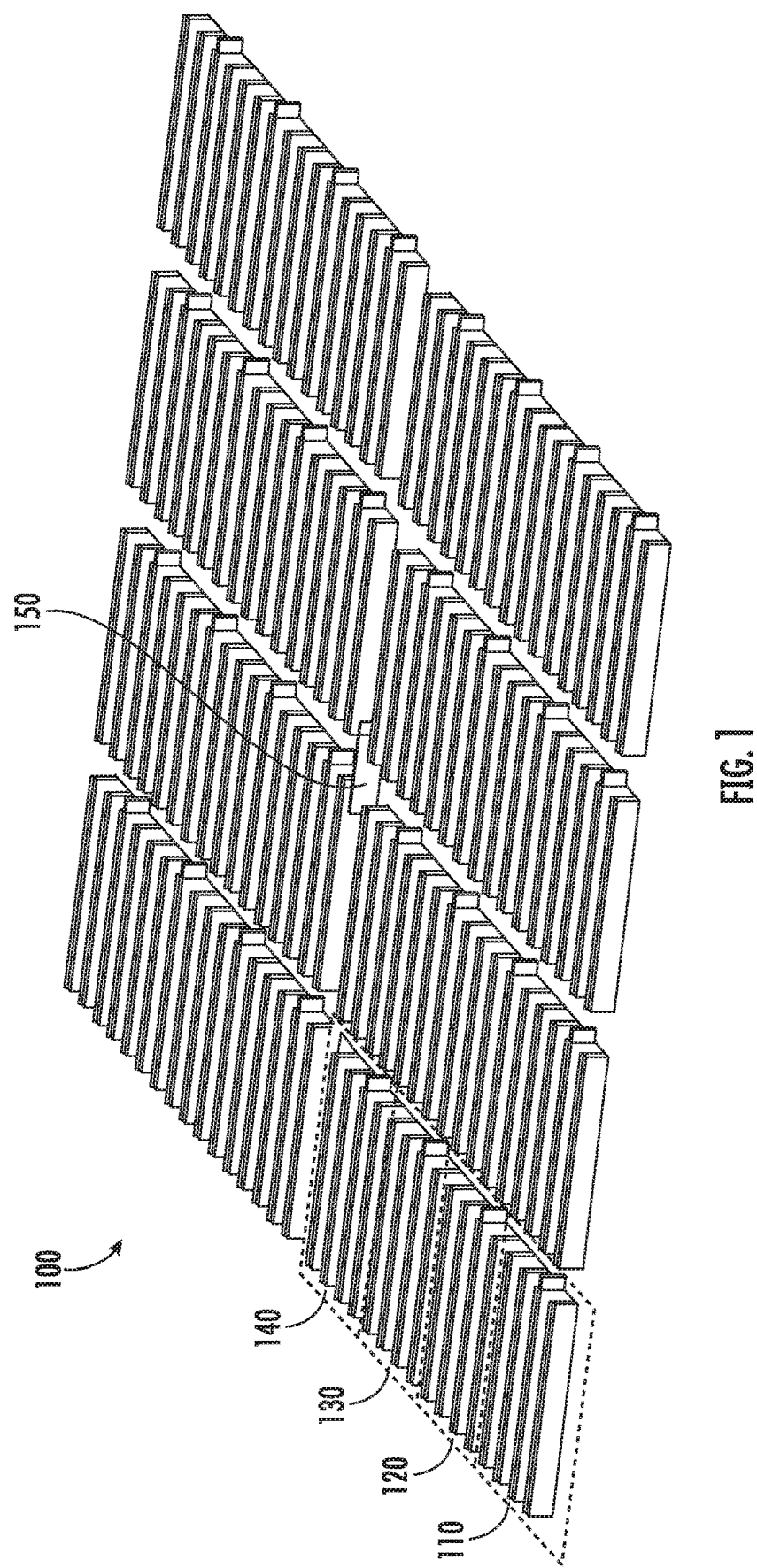
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
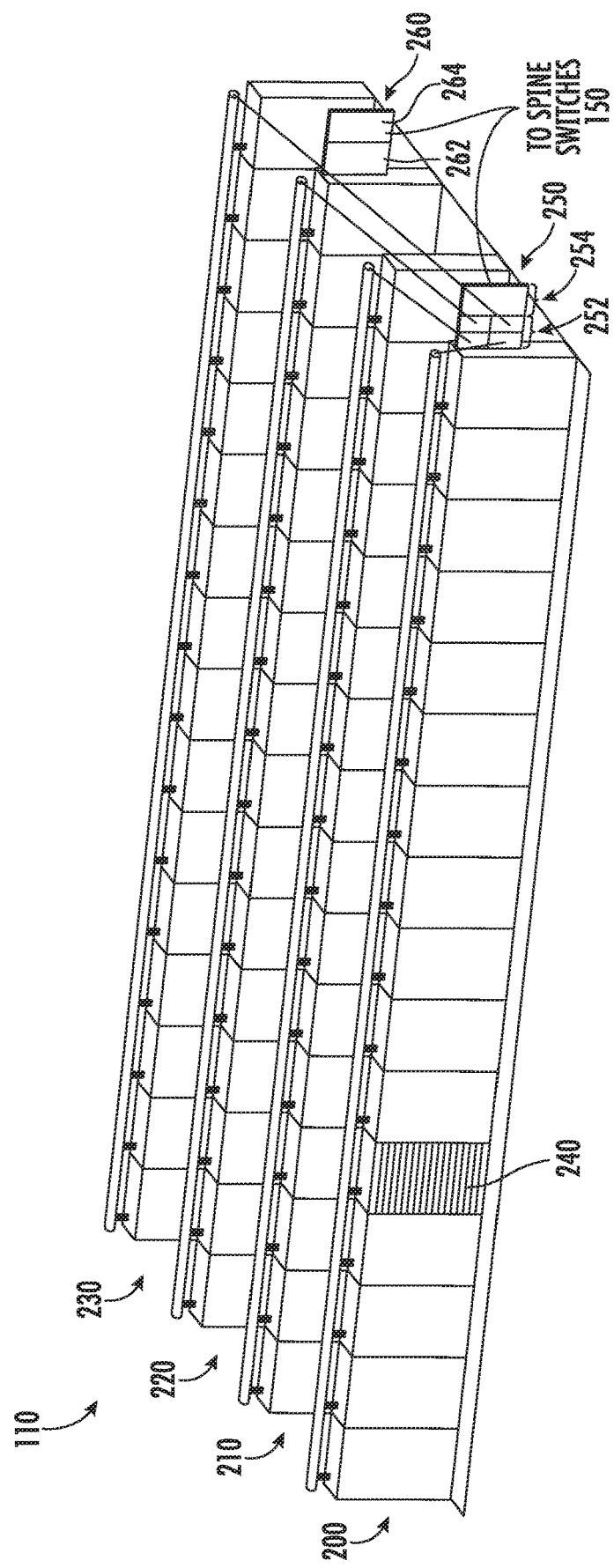
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, InfiniB and, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
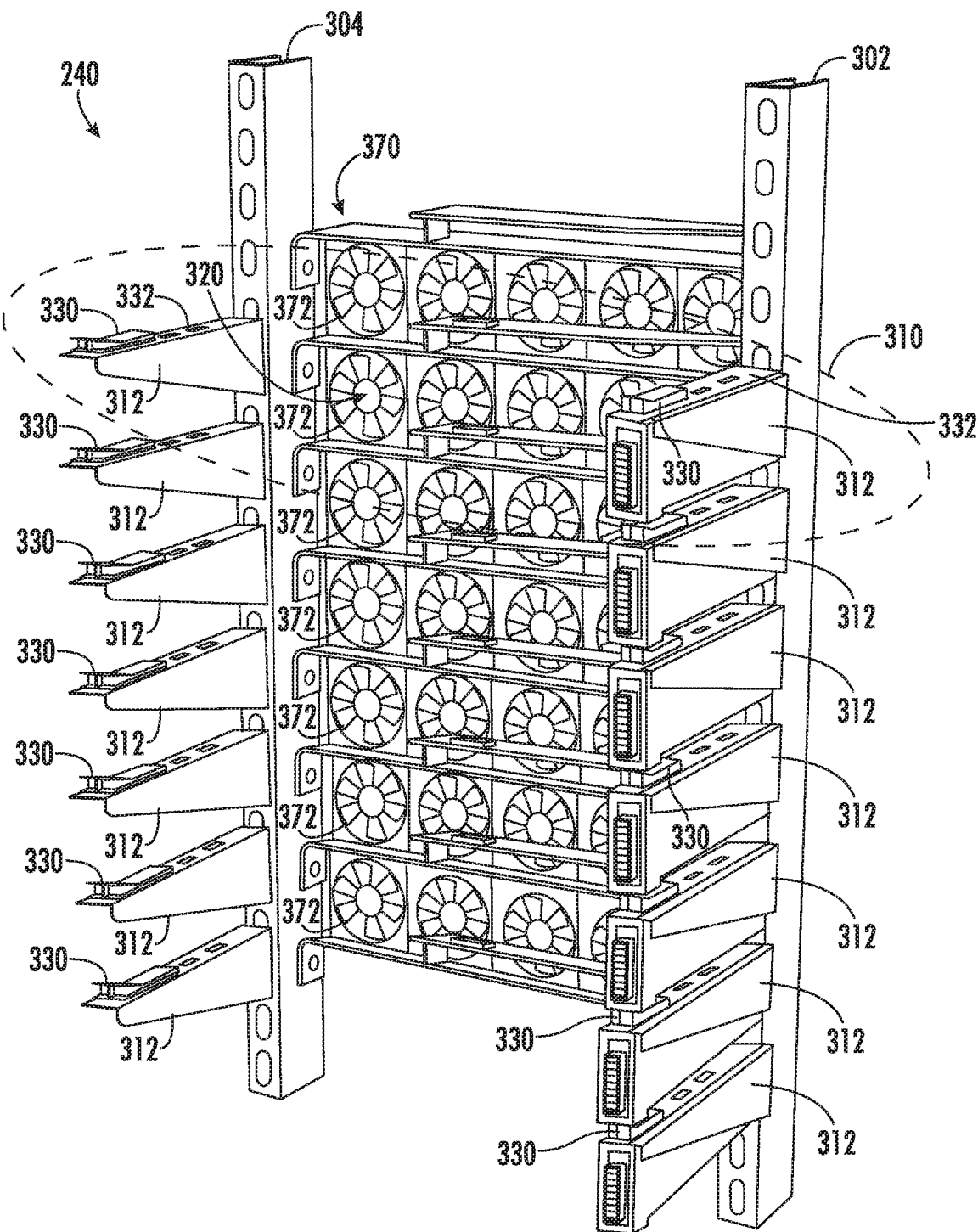
FIG. 3 is a perspective view of at least one embodiment of a rack that may be included in the pod of FIG. 2.
Figure 4:
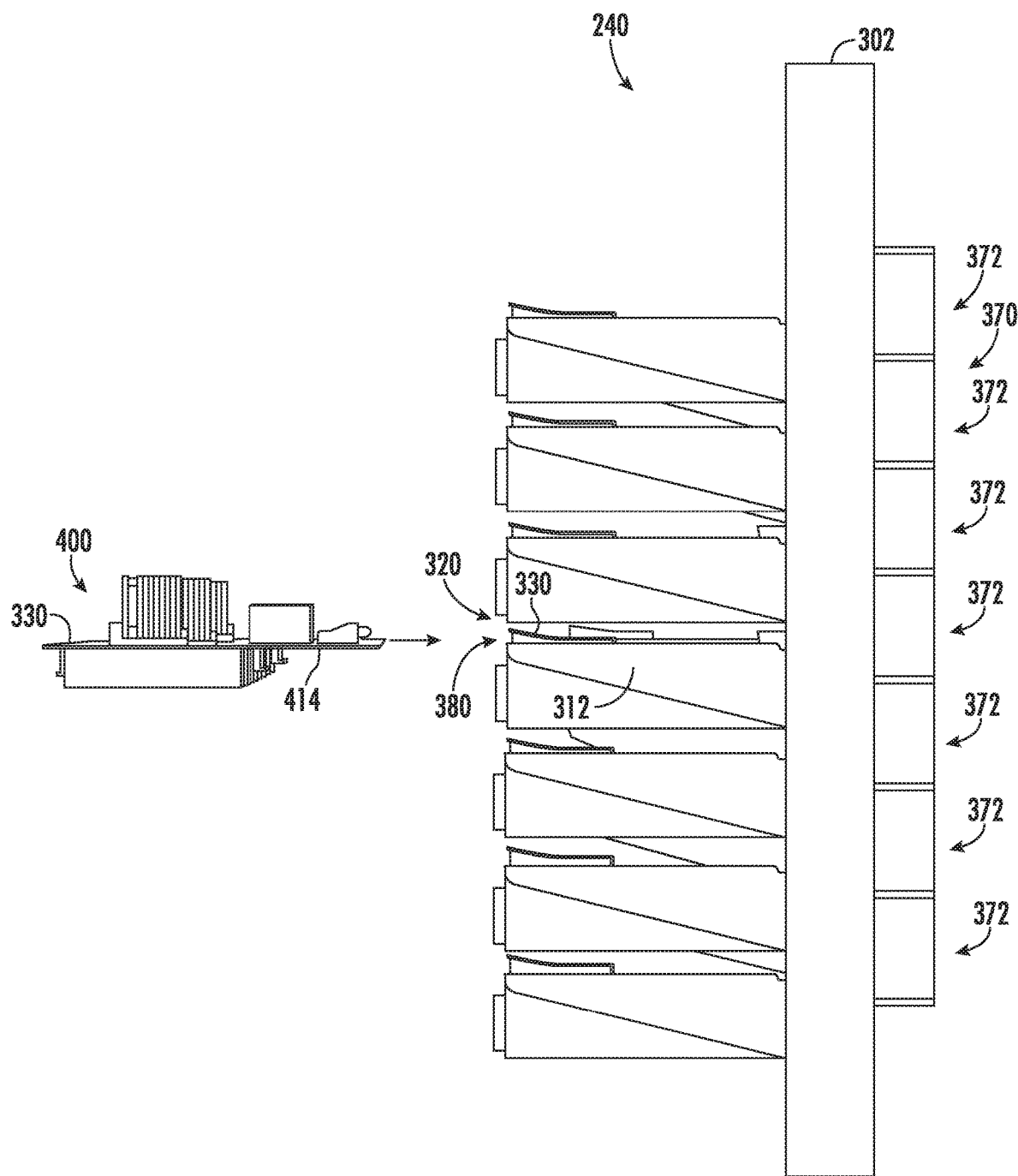
FIG. 4 is a side elevation view of the rack of FIG. 3.
Figure 5:
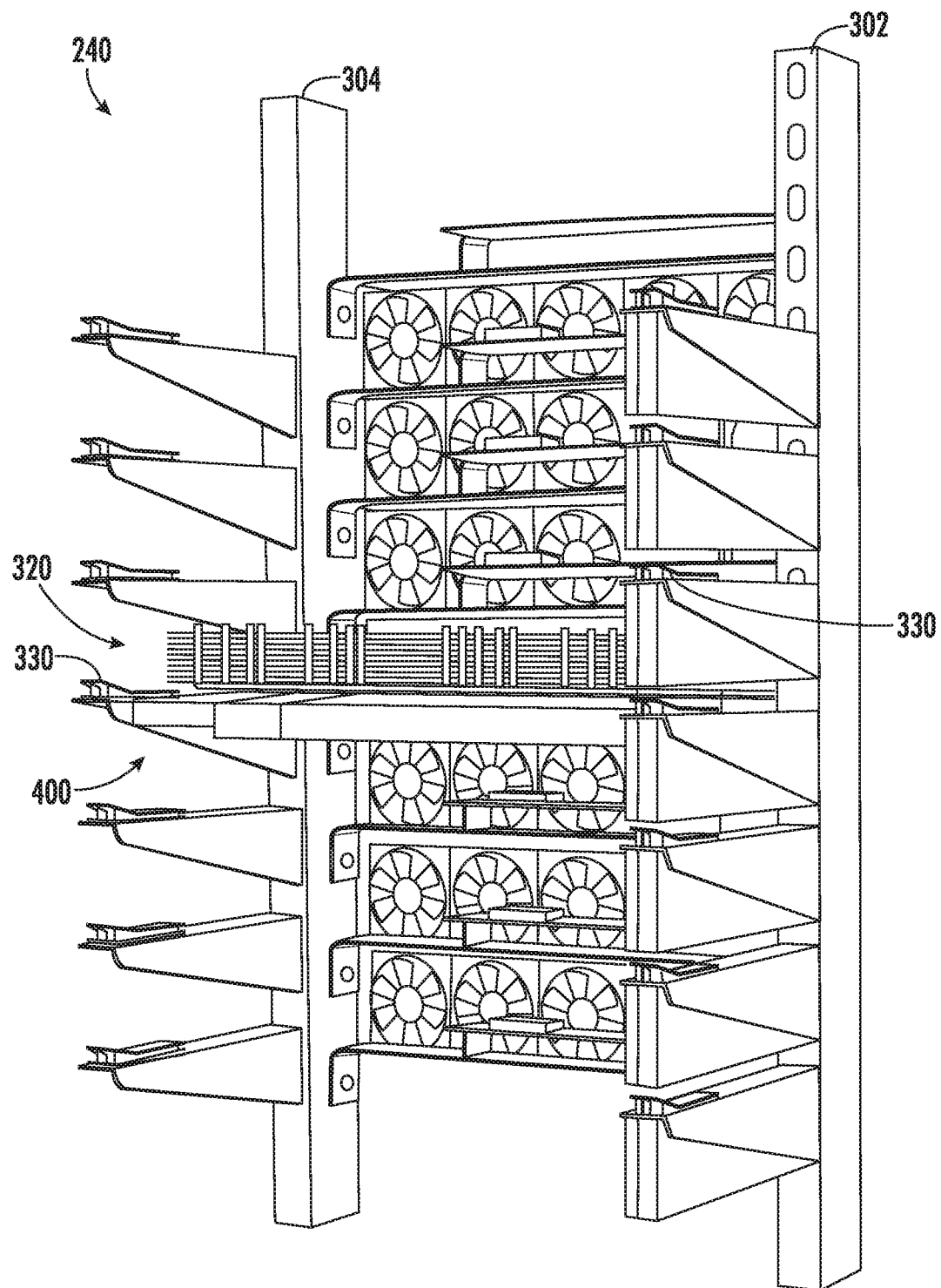
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
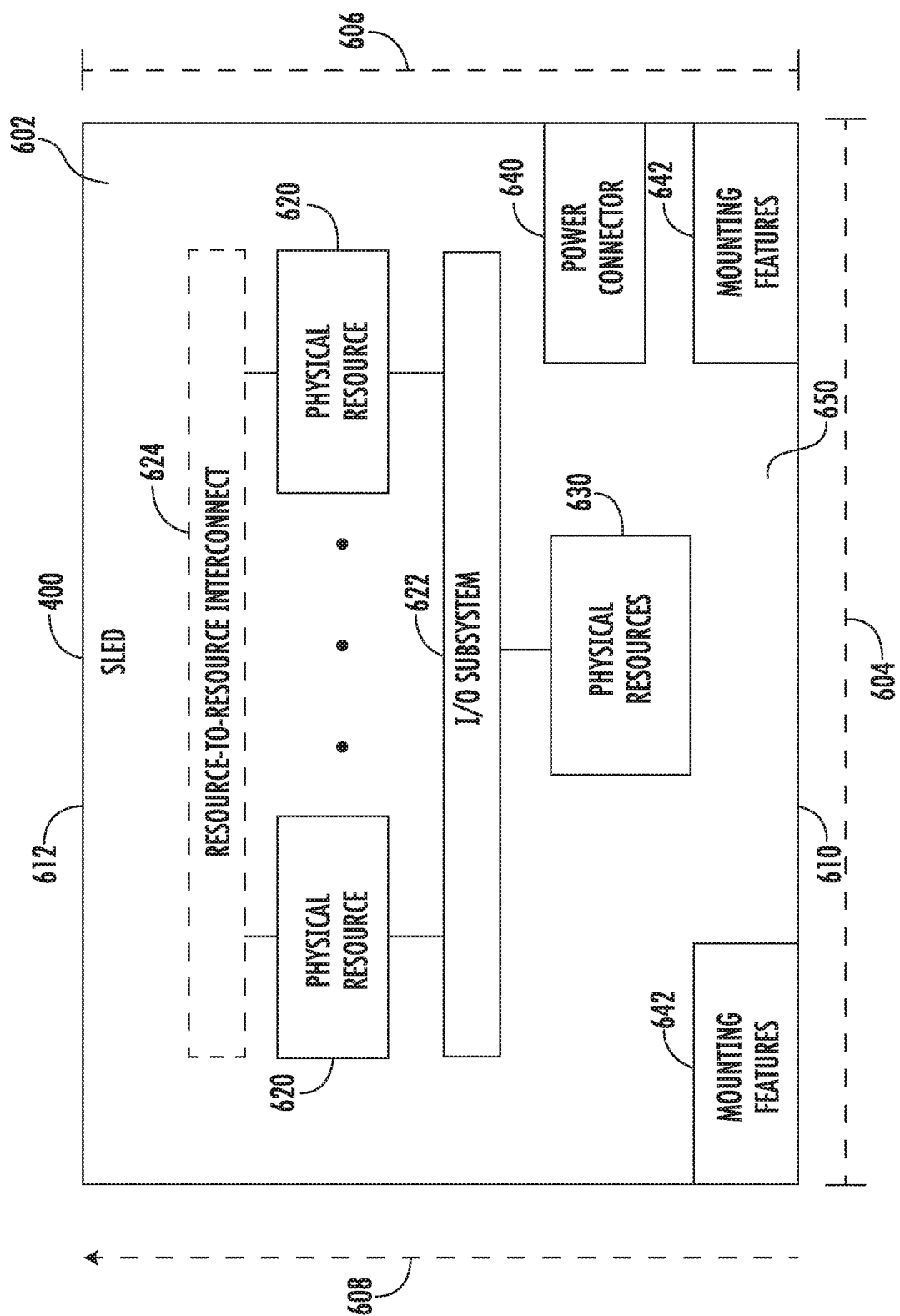
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
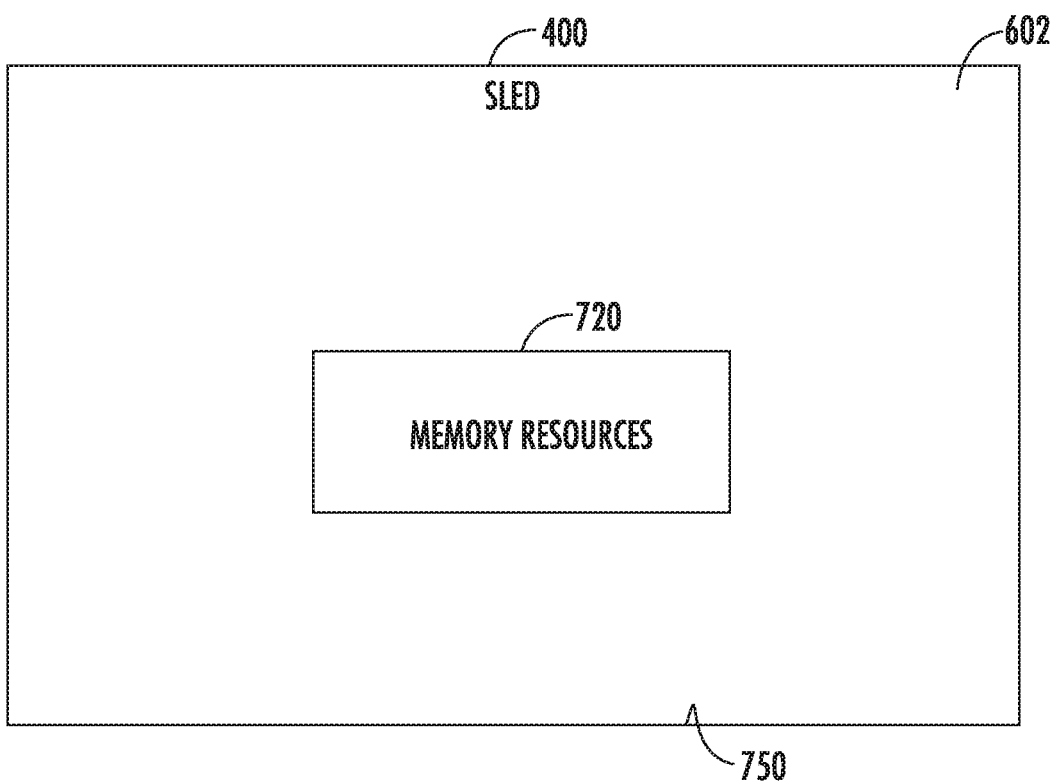
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
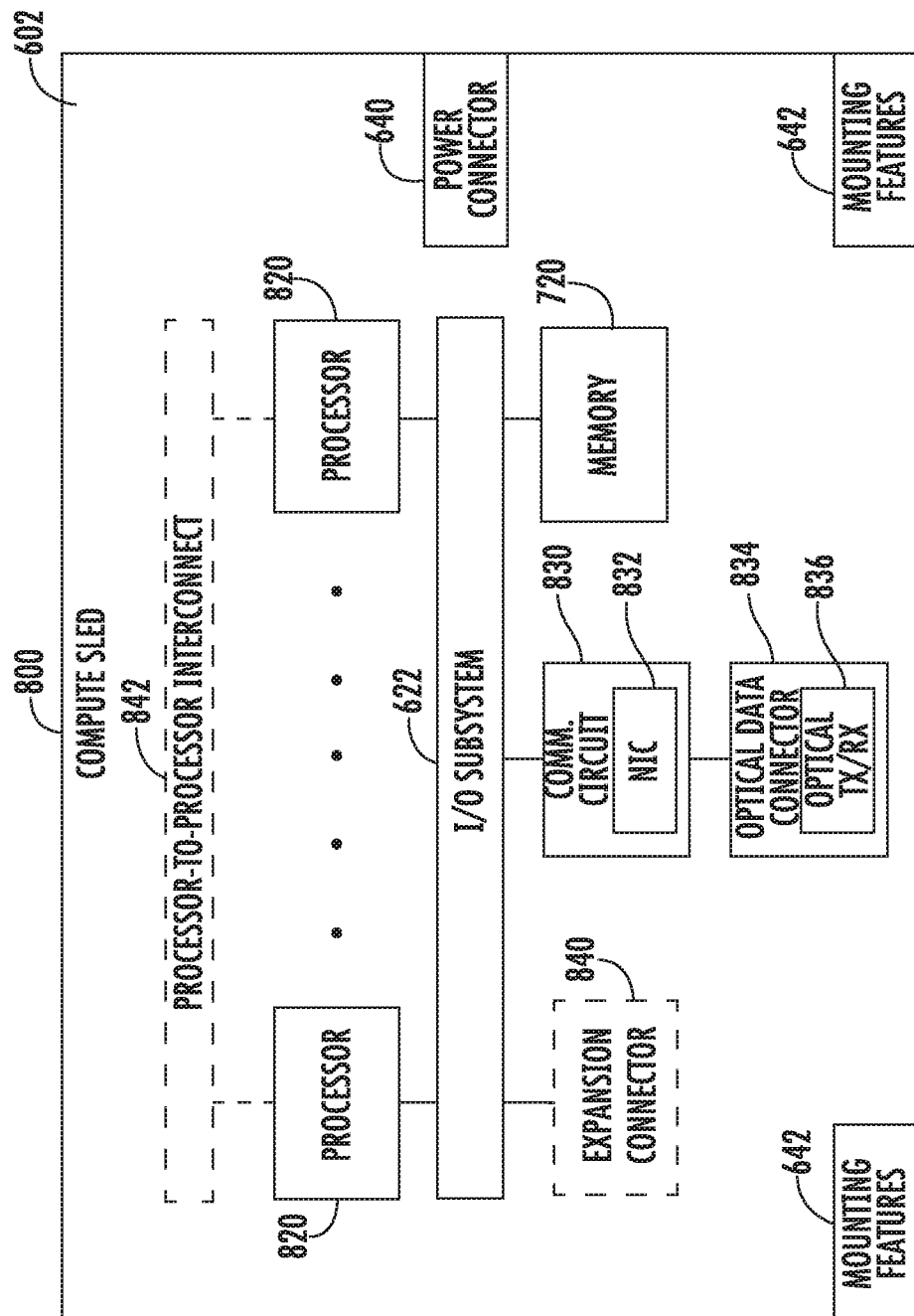
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
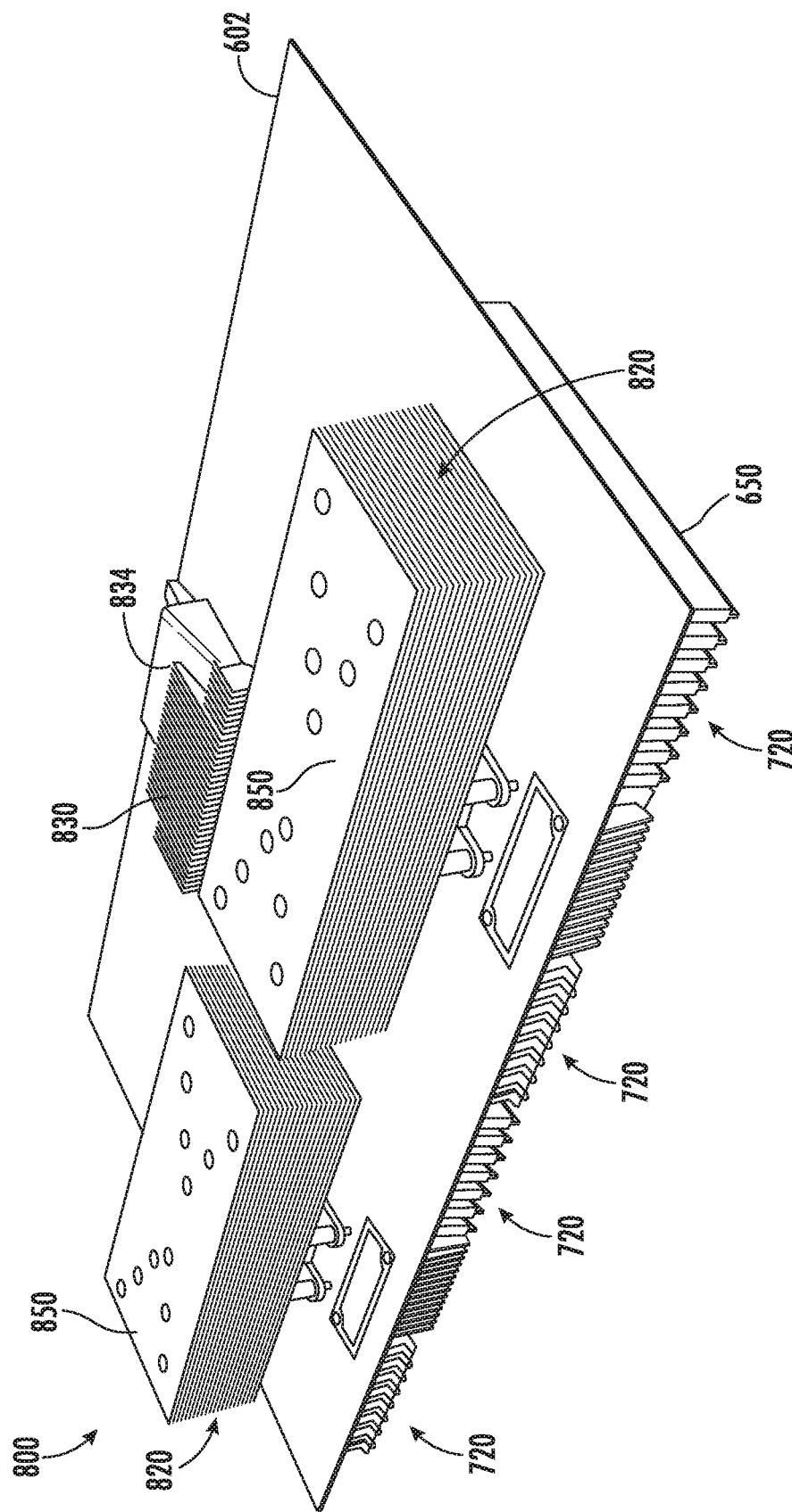
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
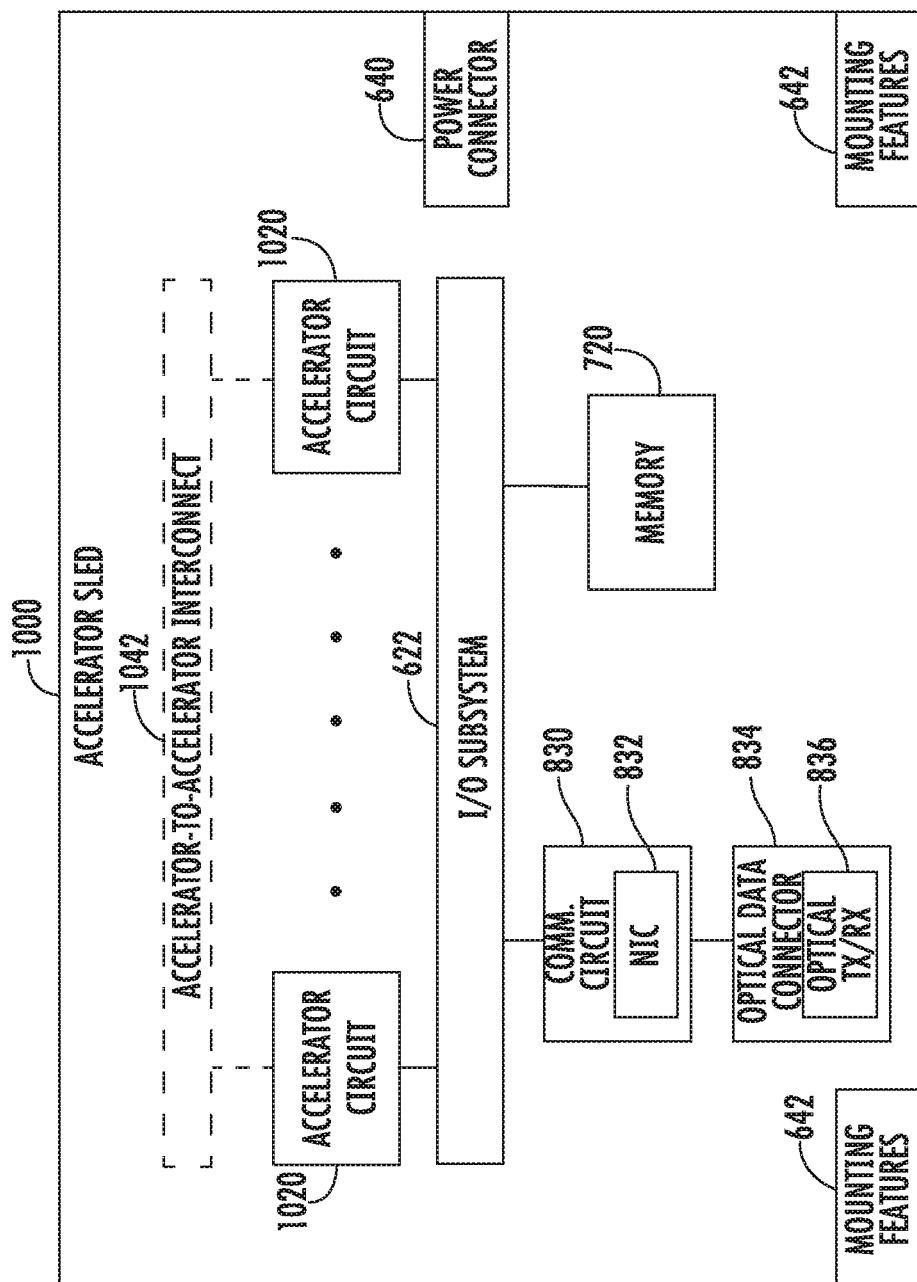
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
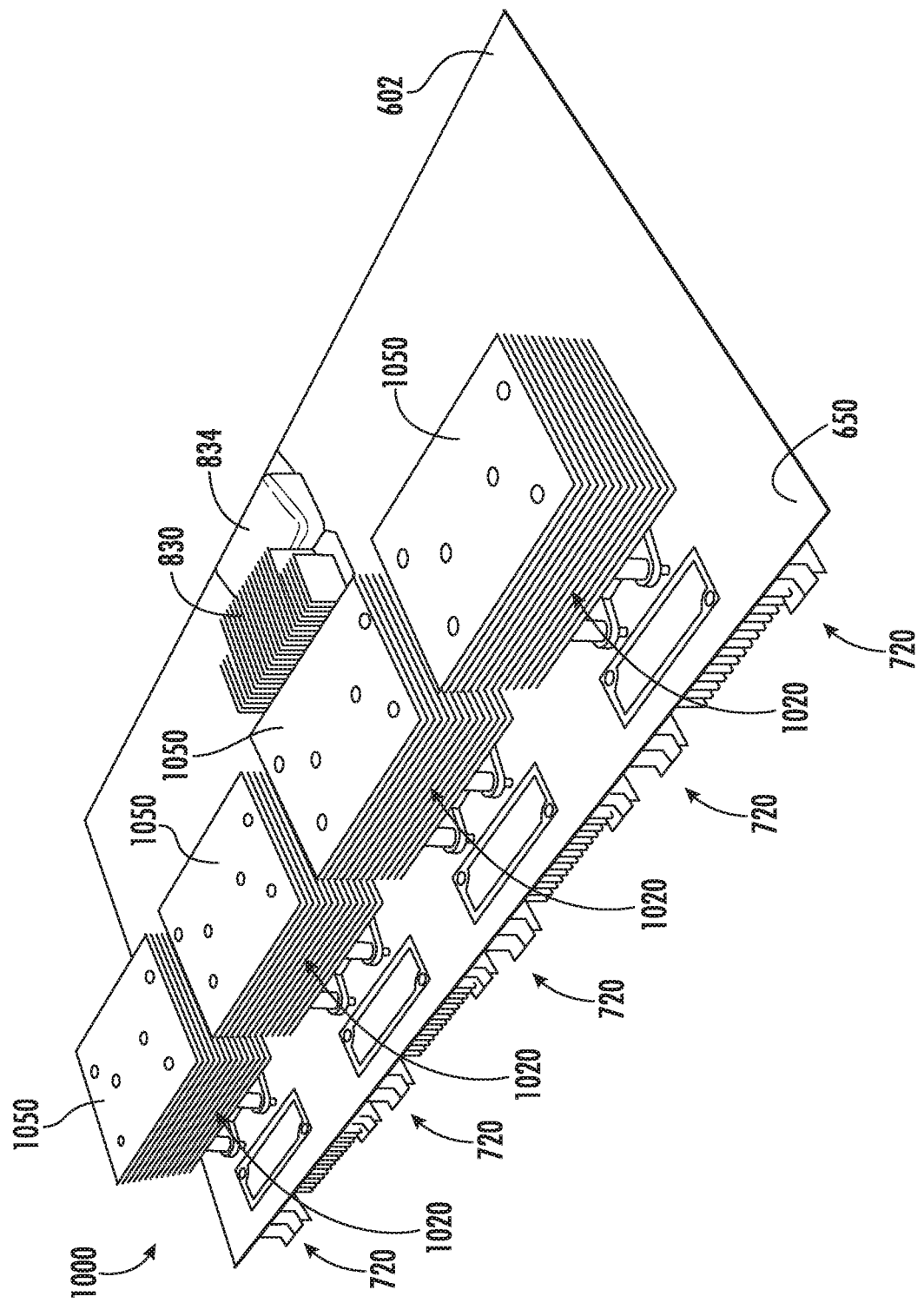
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
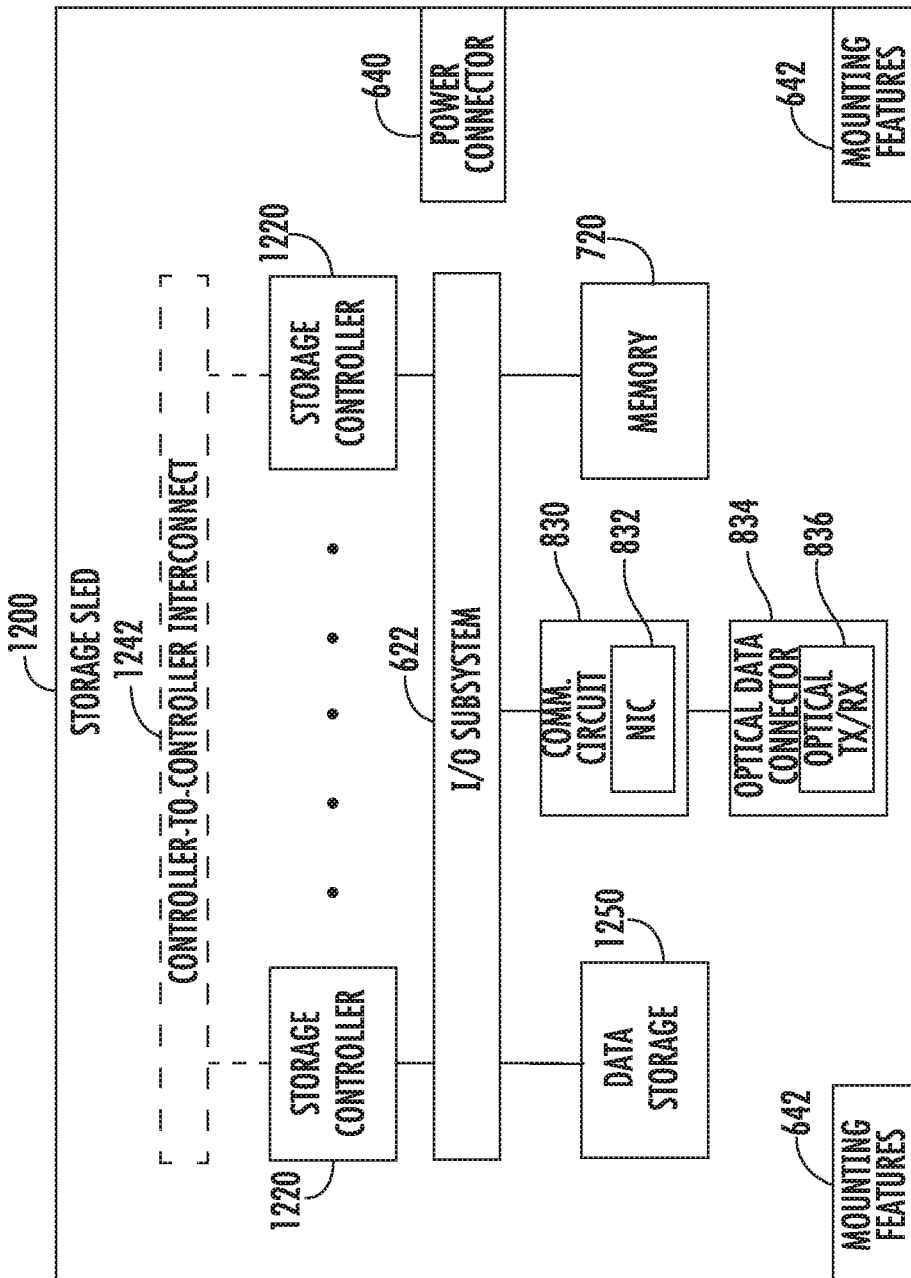
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
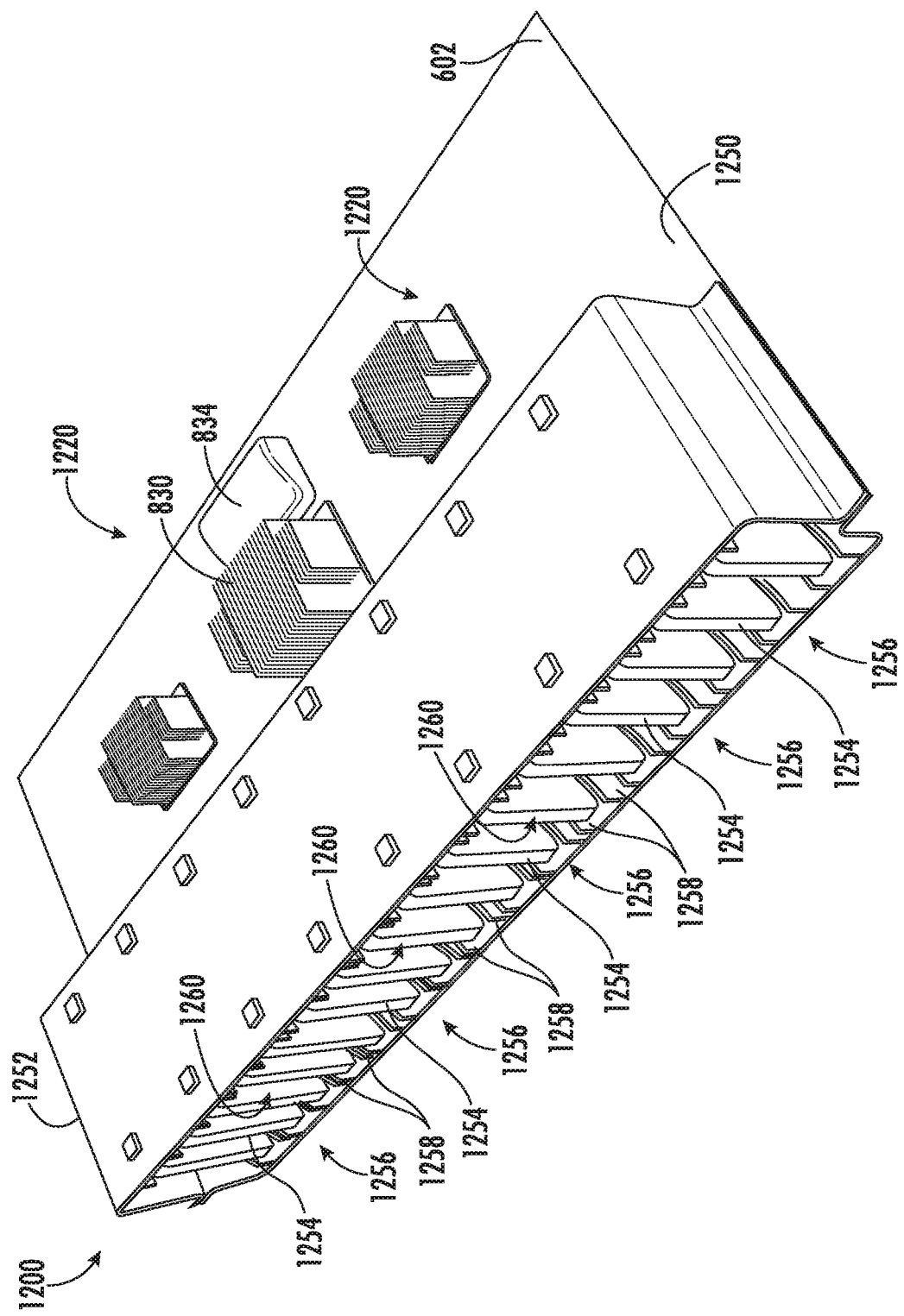
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
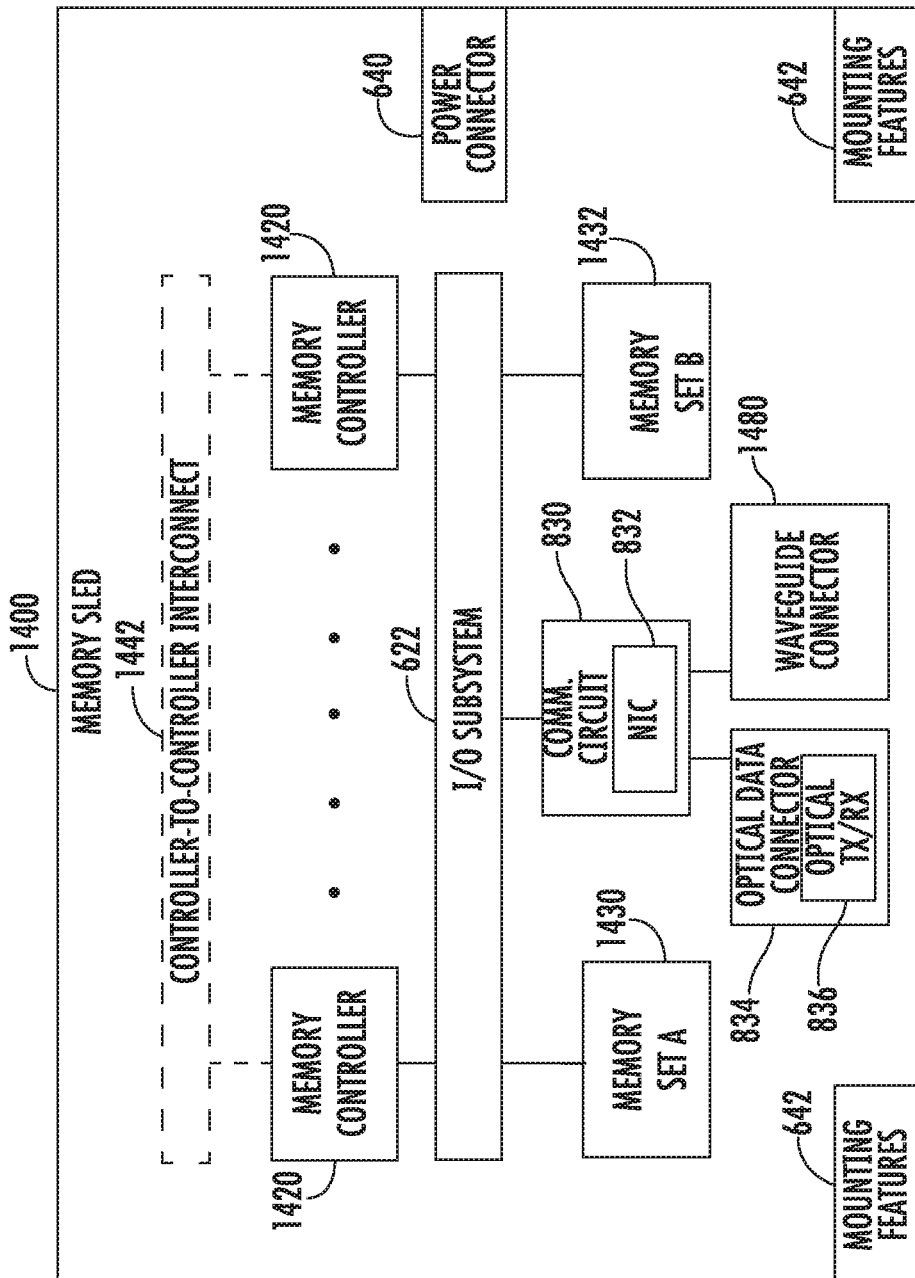
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
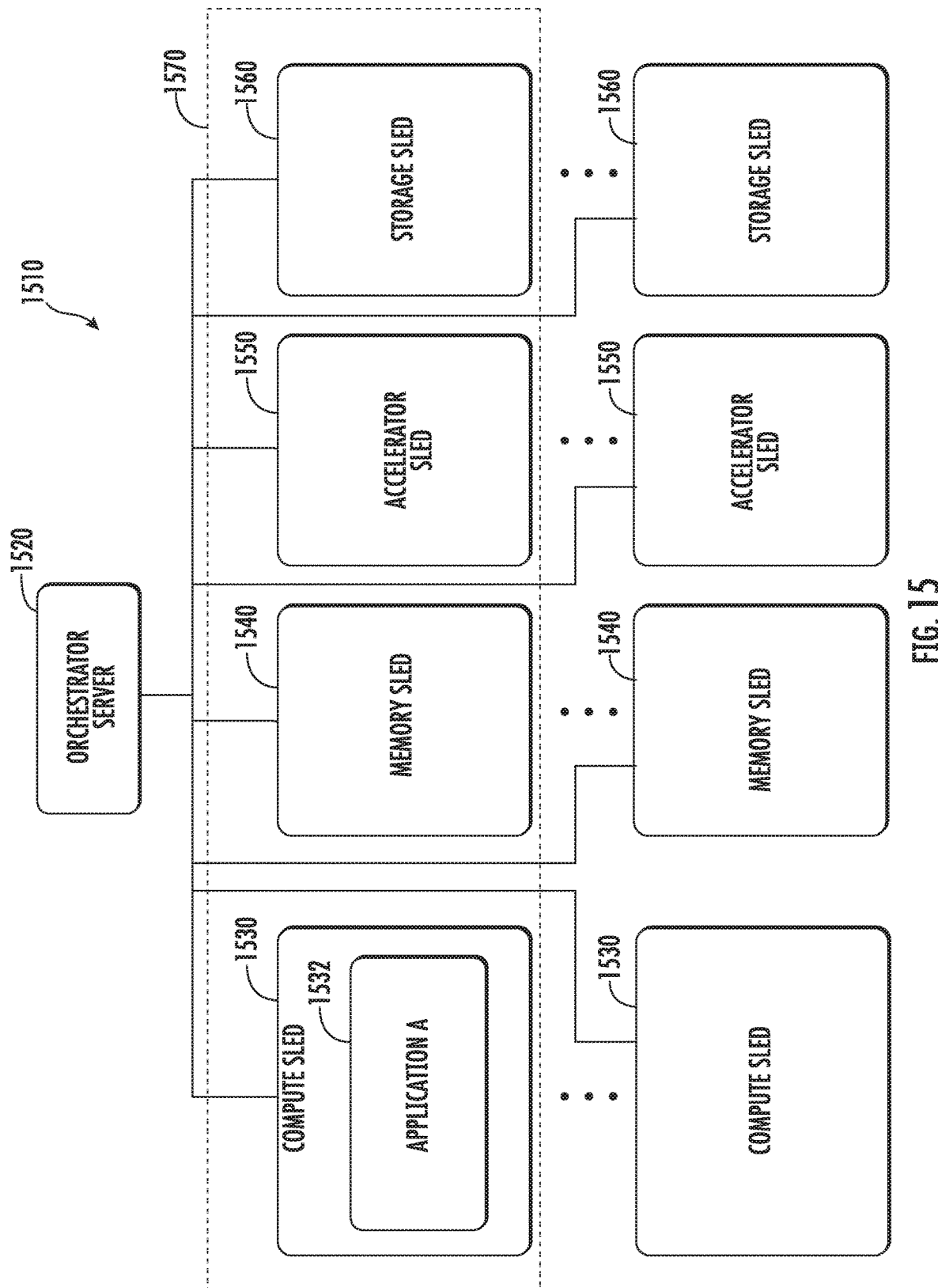
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
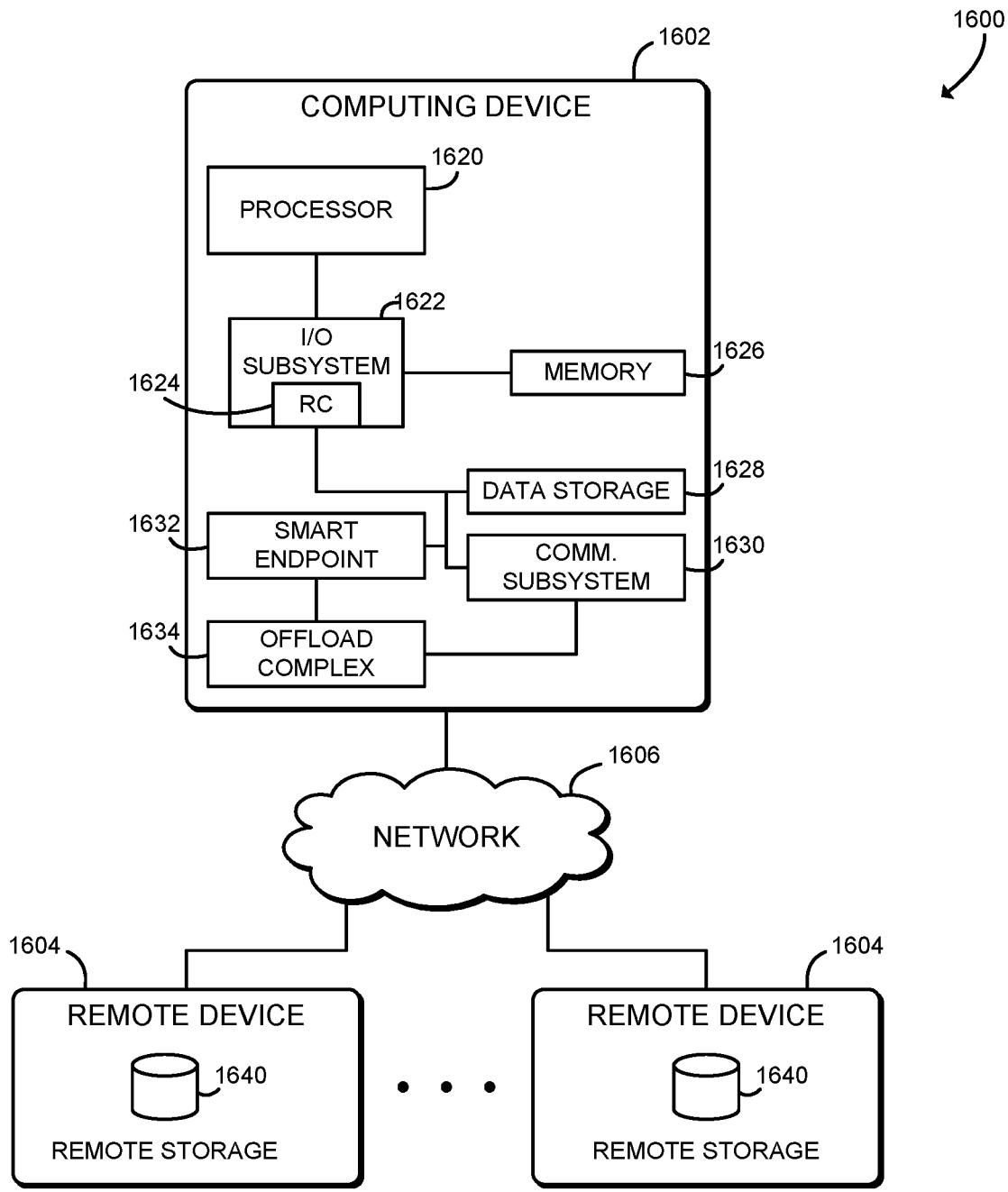
FIG. 16 is a simplified block diagram of at least one embodiment of a system for flexible protocol acceleration.

Referring now to FIG. 16, an illustrative system 1600 for flexible protocol acceleration includes a computing device 1602 and multiple remote devices 1604 in communication over a network 1606. Each of the devices 1602, 1604 may be embodied as one or more sleds 400 in a datacenter (e.g., a compute sled 800 and multiple storage sleds 1200, or another configuration). In use, as described further below, the computing device 1602 issues I/O commands such as NVM Express (NVMe) commands, Intel® Adaptive Virtual Function (AVF) commands, or other I/O commands to a smart endpoint 1632. The computing device 1602 may issue the I/O commands using standard drivers and/or operating systems. The smart endpoint 1632 includes programmable elements that parse and accelerate processing of the I/O commands. The smart endpoint 1632 provides a smart context to an offload complex 1634, which may complete processing of the I/O commands. The protocol parsing and acceleration operations of the smart endpoint 1632 are programmable or otherwise configurable by the computing device 1602. Thus, the system 1600 may support a flexible partitioning of I/O protocol parsing tasks between the offload complex 1634 and the smart endpoint 1632. By offloading tasks to the smart endpoint 1632 from the offload complex 1634, the system 1600 may also improve available processing cycles of the offload complex 1634 and/or may allow the use of a less-expensive offload complex 1634.

The computing device 1602 may be embodied as any type of device capable of performing the functions described herein. For example, the computing device 1602 may be embodied as, without limitation, a sled, a compute sled, an accelerator sled, a storage sled, a computer, a server, a distributed computing device, a disaggregated computing device, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 1602 includes a processor 1620, an I/O subsystem 1622, a memory 1626, a data storage device 1628, and a communication subsystem 1630. Additionally, in some embodiments, one or more of the illustrative components may be incorporated in, or otherwise form a portion of, another component. For example, the memory 1626, or portions thereof, may be incorporated in the processor 1620 in some embodiments.

The processor 1620 may be embodied as any type of processor capable of performing the functions described herein. For example, the processor 1620 may be embodied as a single or multi-core processor(s), digital signal processor, microcontroller, or other processor or processing/controlling circuit. Similarly, the memory 1626 may be embodied as any type of volatile or non-volatile memory or data storage capable of performing the functions described herein. In operation, the memory 1626 may store various data and software used during operation of the computing device 1602 such as operating systems, applications, programs, libraries, and drivers.

Illustratively, the memory 1626 is communicatively coupled to the processor 1620 via the I/O subsystem 1622, which may be embodied as circuitry and/or components to facilitate input/output operations with the processor 1620, the memory 1626, and other components of the computing device 1602. For example, the I/O subsystem 1622 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. As shown, the I/O subsystem 1622 illustratively includes a PCI Express (PCIe) root complex (RC) 1624. The RC 1624 may include one or more root ports, PCIe links, PCIe switches, and/or other components that may be used to communicate I/O data between the host systems of the computing device 1602 (e.g., the processor 1620 and/or the memory 1626) and one or more I/O devices. In some embodiments, the memory 1626 may be directly coupled to the processor 1620, for example via an integrated memory controller hub or a data port. Additionally, in some embodiments, the I/O subsystem 1622 may form a portion of a system-on-a-chip (SoC) and be incorporated, along with the processor 1620, the memory 1626, and other components of the computing device 1602, on a single integrated circuit chip.

The data storage device 1628 may be embodied as any type of device or devices configured for short-term or long-term storage of data such as, for example, memory devices and circuits, memory cards, hard disk drives, solid-state drives, non-volatile flash memory, or other data storage devices. The computing device 1602 may also include a communication subsystem 1630, which may be embodied as any network interface controller (NIC), communication circuit, device, or collection thereof, capable of enabling communications between the computing device 1602 and other remote devices over a computer network (not shown). The communication subsystem 1630 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As shown, the computing device 1602 further includes a smart endpoint 1632 and an offload complex 1634. As described further below, the smart endpoint 1632 is coupled to the RC 1624 and to the offload complex 1634, for example by one or more PCIe lanes. The smart endpoint 1632 receives I/O transactions from the RC 1624 and may processes the I/O transactions and/or provide the I/O transactions to the offload complex 1634. The offload complex 1634 performs further processing of the I/O transactions, for example by performing bare metal virtualization (e.g., virtualizing multiple storage devices, network devices, or other devices). The offload complex 1634 is also coupled to the communication subsystem 1630 and thus may communicate with one or more remote devices 1604. One potential embodiment of the smart endpoint 1632 and the offload complex 1634 are described below in connection with FIG. 17.

Similarly, each remote device 1604 may be embodied as any type of device capable of performing the functions described herein. For example, each remote device 1604 may be embodied as, without limitation, a sled, a compute sled, an accelerator sled, a storage sled, a computer, a server, a distributed computing device, a disaggregated computing device, a laptop computer, a tablet computer, a notebook computer, a mobile computing device, a smartphone, a wearable computing device, a multiprocessor system, a server, a workstation, and/or a consumer electronic device. As such, each remote device 1604 may include components and features similar to the computing device 1602, such as a processor, I/O subsystem, memory, data storage device, communication subsystem, and/or other components of a storage sled. As shown, each remote device 1604 may include remote storage 1640, which may, for example, be accessed by the offload complex 1634 for bare metal virtualization.

As discussed in more detail below, the computing device 1602 and the remote devices 1604 may be configured to transmit and receive data with each other and/or other devices of the system 1600 over the network 1606. The network 1606 may be embodied as any number of various wired and/or wireless networks. For example, the network 1606 may be embodied as, or otherwise include a wired or wireless local area network (LAN), and/or a wired or wireless wide area network (WAN). As such, the network 1606 may include any number of additional devices, such as additional computers, routers, and switches, to facilitate communications among the devices of the system 1600.

Figure 17:
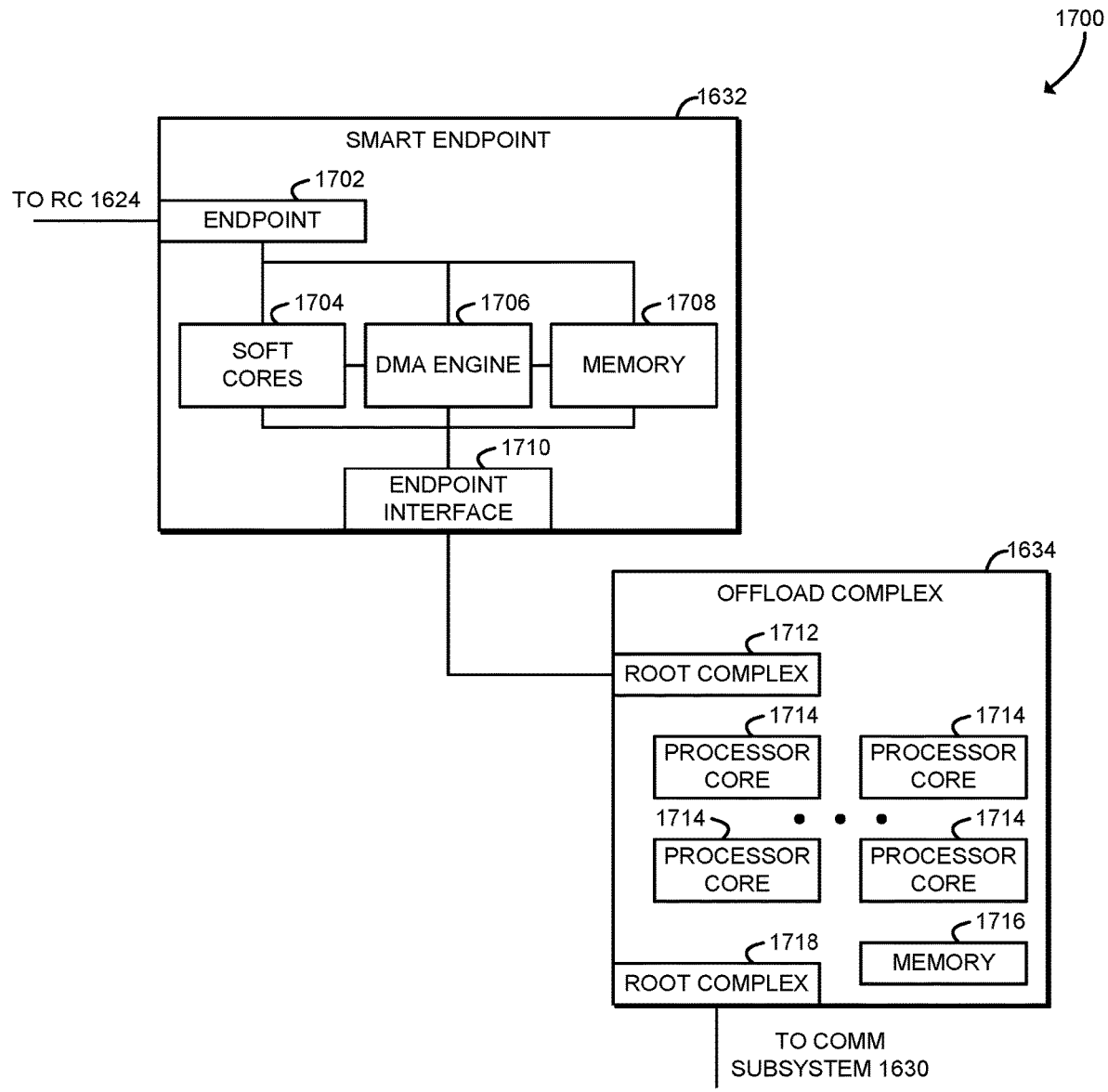
FIG. 17 is a simplified block diagram of at least one embodiment of a smart endpoint and an offload complex of a computing device of FIG. 16.

Referring now to FIG. 17, diagram 1700 illustrates one potential embodiment of the smart endpoint 1632 and the offload complex 1634. As shown, the smart endpoint 1632 includes an endpoint interface 1702, one or more soft cores 1704, a DMA engine 1706, memory 1708, and an endpoint interface 1710. The endpoint interface 1702 is coupled to the root complex (RC) 1624 and may be embodied as any communication circuitry or other components for communicating over a PCIe link with the RC 1624. For example, the endpoint interface 1710 may be embodied as or otherwise include a PCIe physical layer, a PCIe data link layer, and a PCIe transaction layer.

Each of the soft cores 1704 may be embodied as a programmable element such as a state machine, microcontroller, microprocessor, or other computing resource. As described further below, the soft cores 1704 may be configured to emulate a PCIe endpoint hierarchy, process PCI transactions, and perform other tasks as described further below. The DMA engine 1706 may be embodied as a DMA controller or other component that is capable of performing DMA transactions (e.g., reads and/or writes) to transfer data between the memory 1626 and the smart endpoint 1632 and/or between the memory 1626 and the offload complex 1634. The memory 1708 may be embodied as any volatile or non-volatile memory or data storage capable of performing the functions described herein. In operation, the memory 1708 may store various data and software used during operation of the smart endpoint 1632, such as firmware and data processed by the soft cores 1704.

The endpoint interface 1710 is coupled to offload complex 1634 and may be embodied as any communication circuitry or other components for communicating with the offload complex 1634. As shown, the endpoint interface 1710 is coupled to a root complex 1712 of the offload complex 1634. Accordingly, the endpoint interface 1710 may communicate with the offload complex 1634 over PCIe and thus may be embodied as or otherwise include a PCIe physical layer, a PCIe data link layer, and a PCIe transaction layer.

As shown, the offload complex 1634 includes the root complex 1712, multiple processor cores 1714, a memory 1716, and a root complex 1718. As described above, the root complex 1712 is coupled to the endpoint interface 1710 of the smart endpoint 1632. Similar to the RC 1624, the RC 1712 may include one or more root ports, PCIe links, PCIe switches, and/or other components that may be used to communicate I/O data between the offload complex 1634 and the smart endpoint 1632.

Each of the processor cores 1714 may be embodied as any type of processor core capable of performing the functions described herein, such as a single or multi-core processor(s), digital signal processor, microcontroller, or other processor or processing/controlling circuit. The processor cores 1714 may execute instructions from the same instruction set architecture (ISA) as the processor 1620 or a different ISA. For example, in some embodiments the processor cores 1714 may be embodied as Intel® Atom® cores. In other embodiments, the processor cores 1714 may be embodied as ARM cores. The memory 1716 may be embodied as any type of volatile or non-volatile memory or data storage capable of performing the functions described herein. In operation, the memory 1716 may store various data and software used during operation of the offload complex 1634 such as operating systems, applications, programs, libraries, and drivers.

The root complex 1718 is coupled to the communication subsystem 1630 (e.g., to a network interface controller) and may be embodied as any communication circuitry or other components for communicating with the communication subsystem 1630. For example, the root complex 1718 may include one or more root ports, PCIe links, PCIe switches, and/or other components that may be used to communicate I/O data between the offload complex 1634 and the communication subsystem 1630.

Although illustrated as separate components in FIG. 17, it should be understood that in some embodiments the smart endpoint 1632 and the offload complex 1634 may be included in the same component and/or incorporated together with other components. For example, in some embodiments, the smart endpoint 1632 and the offload complex 1634 may be embodied as separate dies included in the same computer chip. In those embodiments, the chip including the smart endpoint 1632 and the offload complex 1634 may be incorporated in a multi-chip package with a NIC (e.g., the communication subsystem 1630), an FPGA, or other components.

Figure 18:
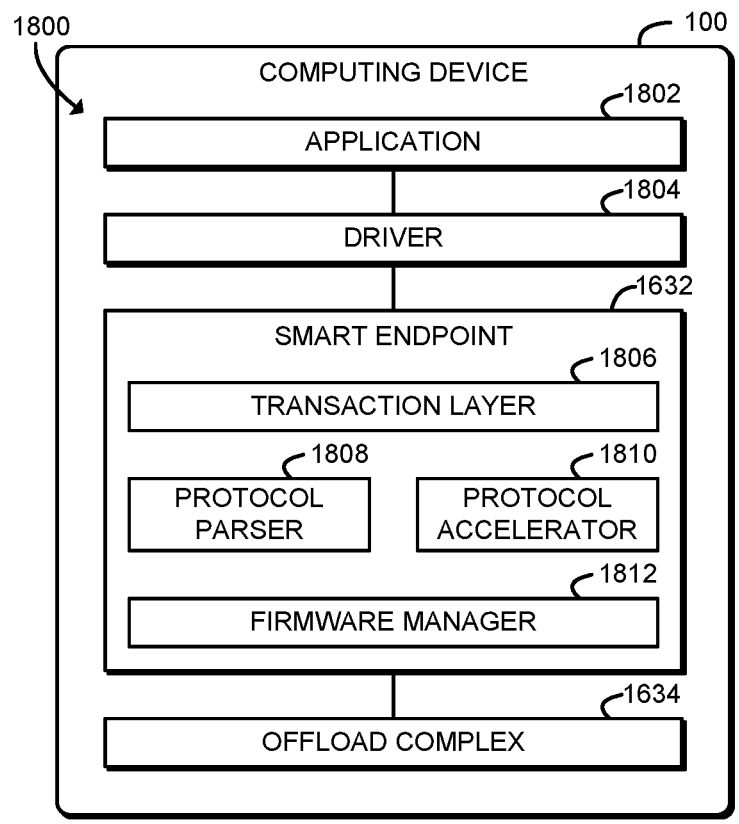
FIG. 18 is a simplified block diagram of at least one embodiment of an environment that may be established by the computing device of FIGS. 16-17.

Referring now to FIG. 18, in an illustrative embodiment, the computing device 1602 establishes an environment 1800 during operation. The illustrative environment 1800 includes an application 1802, a driver 1804, a transaction layer 1806, a protocol parser 1808, a protocol accelerator 1810, and a firmware manager 1812. The various components of the environment 1800 may be embodied as hardware, firmware, software, or a combination thereof. As such, in some embodiments, one or more of the components of the environment 1800 may be embodied as circuitry or collection of electrical devices (e.g., application circuitry 1802, driver circuitry 1804, transaction layer circuitry 1806, protocol parser circuitry 1808, protocol accelerator circuitry 1810, and/or firmware manager circuitry 1812). It should be appreciated that, in such embodiments, one or more of the application circuitry 1802, the driver circuitry 1804, the transaction layer circuitry 1806, the protocol parser circuitry 1808, the protocol accelerator circuitry 1810, and/or the firmware manager circuitry 1812 may form a portion of the processor 1620, the I/O subsystem 1622, the smart endpoint 1632, and/or other components of the computing device 1602. Additionally, in some embodiments, one or more of the illustrative components may form a portion of another component and/or one or more of the illustrative components may be independent of one another.

The application 1802 may be embodied as any user application, system application, or other application executed by the computing device 1602. Similarly, the driver 1804 may be embodied as any device driver, operating system, virtual machine monitor, and/or hypervisor that controls or otherwise communicates I/O data with the smart endpoint 1632. The driver 1804 may communicate with the smart endpoint 1632 using one or more standardized device protocols, such as NVM Express (NVMe), VirtIO, AVF, or other protocols. For example, the driver 1804 may be embodied as a storage driver, a network driver, or other device driver. The application 1802 may access services provided by the smart endpoint 1632 and/or the offload complex 1634 via the driver 1804.

The firmware manager 1812 is configured to program endpoint firmware of the smart endpoint 1632. For example, the endpoint firmware may be stored in the memory 1708 of the smart endpoint 1632 and executed with one or more of the soft cores 1704 of the smart endpoint 1632. The firmware manager 1812 may be embodied as any device driver, debugger, flash memory programmer, integrated development environment, deployment manager, dashboard, or other component capable of programming the endpoint firmware to the smart endpoint 1632.

The transaction layer 1806 is configured to receive an I/O transaction originating from the root complex 1624. The I/O command may be embodied as, for example, an NVMe command, a VirtIO command, or an AVF command.

The protocol parser 1808 is configured to parse the I/O transaction based on an I/O protocol in response to receiving the I/O transaction. Parsing may be performed according to one or more instructions or other data of the endpoint firmware. Parsing the I/O transaction may include determining whether the I/O transaction is a doorbell notification, for example by determining whether the I/O transaction is a tail pointer update. The protocol parser 1808 is further configured to identify an I/O command in response to parsing the I/O transaction. Identify the I/O command may include identifying the I/O command in the host memory 1626 in response to determining that the I/O transaction is a doorbell notification.

The protocol accelerator 1810 is configured to accelerate the I/O command. Accelerating the I/O command may include copying the I/O command to the memory 1708 of the smart endpoint 1632 or the memory 1716 of the offload complex 1634. The I/O command may be read from the host memory 1626, for example using the DMA engine 1706 of the smart endpoint 1632. In some embodiments, accelerating the I/O command may include identifying protocol data associated with the I/O command and copying the protocol data to the memory 1708 or the memory 1716. The protocol data may be read from the host memory 1626, for example by parsing a scatter-gather list of the I/O command. The protocol accelerator 1810 is further configured to provide a smart context to the offload complex 1634 in response to accelerating the I/O command. The smart context may include the I/O command, a pointer to a location of the I/O command, the protocol data, and/or a pointer to a location of the protocol data.

Figure 19:
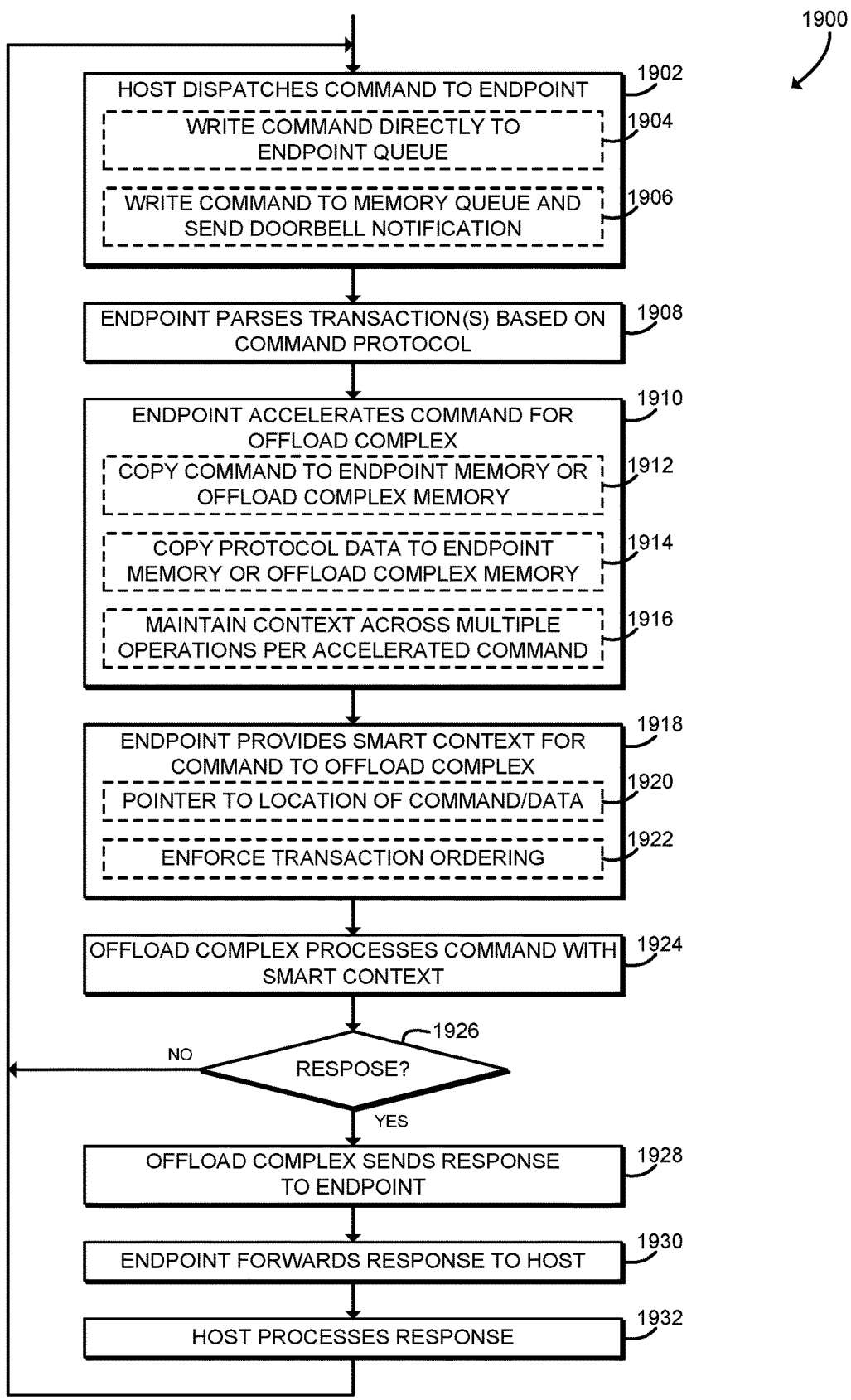
FIG. 19 is a simplified flow diagram of at least one embodiment of a method for flexible protocol acceleration that may be executed by the computing device of FIGS. 16-18.

Referring now to FIG. 19, in use, the computing device 1602 may execute a method 1900 for flexible protocol acceleration. It should be appreciated that, in some embodiments, the operations of the method 1900 may be performed by one or more components of the environment 1800 of the computing device 1602 as shown in FIG. 18. The method 1900 begins in block 1902, in which the host (e.g., the application 1802 and/or the driver 1804 executed by the processor 1620 of the computing device 1602) dispatches an I/O command to the smart endpoint 1632. The I/O command may be embodied as any descriptor, instruction, I/O transaction, or other command issued to the smart endpoint 1632. For example, the I/O command may be an NVMe command, a VirtIO command, or an AVF command. The host may write the command to a command queue or other data structure, and may dispatch the command to the smart endpoint 1632 using one or more I/O transactions (e.g., one or more PCIe transaction layer packets (TLPs) or other transactions). The I/O command may be dispatched using a push model, a pull model, or a combination of those models. The particular model used may depend on the particular I/O protocol and/or application in use.

In some embodiments, in block 1904 the computing device 1602 may write the command directly to an endpoint queue in the smart endpoint 1632 (e.g., a push model). For example, the endpoint queue may be embodied as a circular buffer or other range of the memory 1708 of the smart endpoint 1632. The host may write the command with one or more I/O transactions, DMA transfers, or other transactions. Pushing the I/O command may reduce latency as compared to a pull model. However, the queue on the smart endpoint 1632 may be smaller relative as compared to a pull model.

In some embodiments, in block 1906 the computing device 1602 may write the command to a command queue in the memory 1626 and then send a doorbell notification to the smart endpoint 1632. For example, after writing the command to the memory 1626, the computing device 1602 may update a tail pointer register of the smart endpoint 1632, for example by writing to the register with one or more I/O transactions. As described further below, the smart endpoint 1632 may identify the doorbell notification and read the I/O command from the memory 1626 (e.g., a pull model). By maintaining the queue in the memory 1626, the queues for a pull model may be larger relative to a push model. The pull model may reduce overhead for the processor 1620 as compared to the push model. However, the pull model may have increased latency and may require increased complexity for the smart endpoint 1632 as compared to the push model.

In block 1908, the smart endpoint 1632 parses one or more I/O transactions based on an I/O protocol. The smart endpoint 1632 may parse the I/O transactions to identify or otherwise process the I/O command dispatched by the host. For example, the smart endpoint 1632 may parse I/O transactions based on an NVMe protocol, a VirtIO protocol, or an AVF protocol. The smart endpoint 1632 may parse the I/O transaction based on endpoint firmware. Thus, the smart endpoint 1632 may be flexibly programmed to process different I/O protocols or updated I/O protocols.

In block 1910, the smart endpoint 1632 accelerates the I/O command for the offload complex 1634. Accelerating the I/O command may include any operations that offload protocol processing from the offload complex 1634 to the smart endpoint 1632. The smart endpoint 1632 may accelerate the I/O transaction based on endpoint firmware. Thus, the smart endpoint 1632 may be flexibly programmed to perform different acceleration operations or techniques. In some embodiments, in block 1912, the smart endpoint 1632 may copy the I/O command to the memory 1708 of the smart endpoint 1632 or to the memory 1716 of the offload complex 1634. The smart endpoint 1632 may copy the I/O command from a source such as the host memory 1626 or a command buffer of the memory 1708. The command may be copied to the smart endpoint 1632 and/or the offload complex 1634 using the DMA engine 1706 of the smart endpoint 1632. Similarly, in some embodiments, in block 1914, the smart endpoint 1632 may copy protocol data to the memory 1708 of the smart endpoint 1632 or to the memory 1716 of the offload complex 1634. The protocol data may be embodied as one or more memory pages, memory ranges, and/or memory addresses identified by the I/O command. For example, the I/O command may include a scatter-gather list, linked list, or other data structure identifying the protocol data. In some embodiments, the smart endpoint 1632 may parse multiple lists or other data structures to follow chained protocol data. The smart endpoint 1632 may copy the protocol data from a source such as the host memory 1626 or a buffer of the memory 1708. The protocol data may be copied to the smart endpoint 1632 and/or the offload complex 1634 using the DMA engine 1706 of the smart endpoint 1632. In some embodiments, in block 1916 the smart endpoint 1632 may maintain context across multiple distinct operations per accelerated command. For example, the smart endpoint 1632 may maintain context for multiple DMA transactions per doorbell notification. Thus, by copying the I/O command and/or the protocol data, the smart endpoint 1632 may offload one or more DMA transactions from the offload complex 1634, which may reduce processing requirements for the offload complex 1634 and/or reduce latency experienced by the offload complex 1634.

In block 1918, the smart endpoint 1632 provides smart context data to the offload complex 1634. The smart context may be embodied as any data that may be used by the offload complex 1634 to process the I/O command. The smart endpoint 1632 may use any appropriate technique to provide the smart context to the offload complex 1634. In some embodiments the smart endpoint 1632 may push the smart context to the offload complex 1634, for example with one or more writes or other I/O transactions. In some embodiments, the smart endpoint 1632 may notify the offload complex 1634 (e.g., with an interrupt or a doorbell notification) and the offload complex 1634 may pull the smart context from the smart endpoint 1632, for example with one or more reads or other I/O transactions. In some embodiments, in block 1920, the smart endpoint 1632 may provide a pointer to the location of the I/O command and/or protocol data. The pointer may identify the command or data in the memory 1708 of the smart endpoint 1632 or in some embodiments in the memory 1716 of the offload complex 1634. In some embodiments, in block 1922 the smart endpoint 1632 may enforce transaction ordering specified by the appropriate I/O protocol. For example, command and protocol data may arrive at the smart endpoint 1632 in any order in response to DMA transactions, and the smart endpoint 1632 may enforce protocol ordering before sending the smart context to the offload complex 1634.

In block 1924, the offload complex 1634 processes the I/O command using the smart context. For example, the offload complex 1634 may execute a storage stack to emulate one or more I/O devices for bare metal virtualization. As part of processing the I/O command, the offload complex 1634 may access remote storage 1640 on one or more remote devices 1604 (e.g., storage sleds or other remote devices). The offload complex 1634 may use the smart context to access I/O command data or protocol data that has already been retrieved or otherwise processed by the smart endpoint 1632, which may reduce processing demands on the offload complex 1634.

In block 1926, the computing device 1602 determines whether a response is expected to the I/O command. For example, certain I/O commands may be posted, for which a response is not expected, or non-posted, for which a response is expected. If no response is expected, the method 1900 loops back to block 1902 to continue processing I/O commands. If a response is expected, the method 1900 advances to block 1928.

In block 1928, the offload complex 1634 sends a response to the smart endpoint 1632. The response may be embodied as one or more I/O completions, I/O transactions, or other responses, and may include status information, protocol data, or other data generated by the offload complex 1634. The offload complex 1634 may use any technique to transfer the response. For example, in some embodiments the offload complex 1634 may push the response to the smart endpoint 1632, for example with one or more writes or other I/O transactions into the memory 1708. As another example, the offload complex 1634 may notify the smart endpoint 1632 (e.g., with an interrupt or a doorbell notification) and the smart endpoint 1632 may pull the response from the offload complex 1634, for example with one or more reads or other I/O transactions.

In block 1930, the smart endpoint 1632 forwards the response to the root complex 1624 of the host. The smart endpoint 1632 forwards the response using a technique specified by the corresponding I/O protocol. For example, the smart endpoint 632 may forward the response as one or more I/O completions, I/O transactions, interrupts, or other data transfers. In block 1932, the host (e.g., the application 1802 and/or the driver 1804 executed by the processor 1620 of the computing device 1602) processes the response. After processing the response, the method 1900 loops back to block 1902 to continue processing I/O commands.

Figure 20:
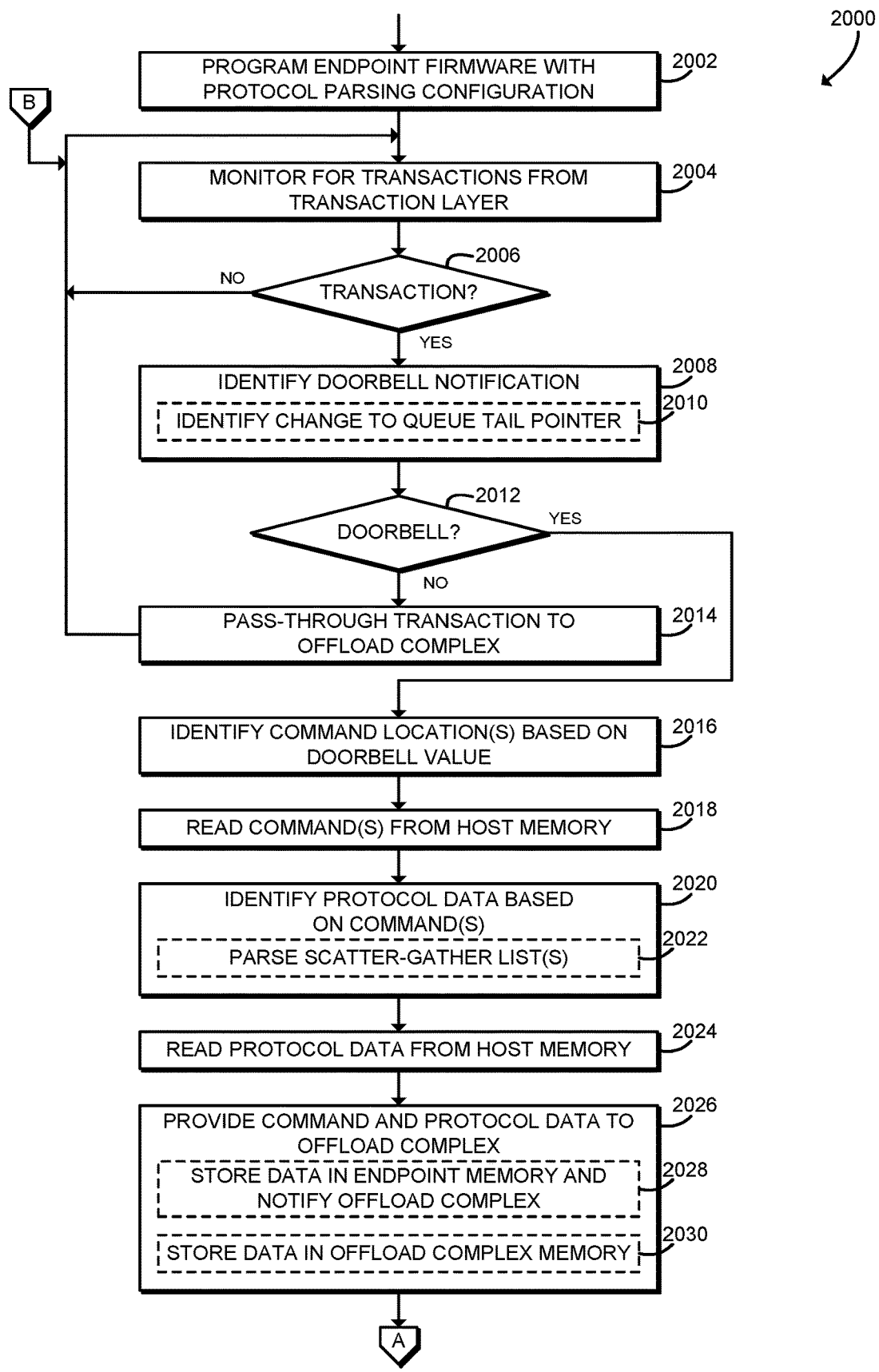
FIGS. 20 and 21 are a simplified flow diagram of at least one embodiment of a method for flexible doorbell notification acceleration that may be executed by a smart endpoint of FIGS. 16-18.
Figure 21:
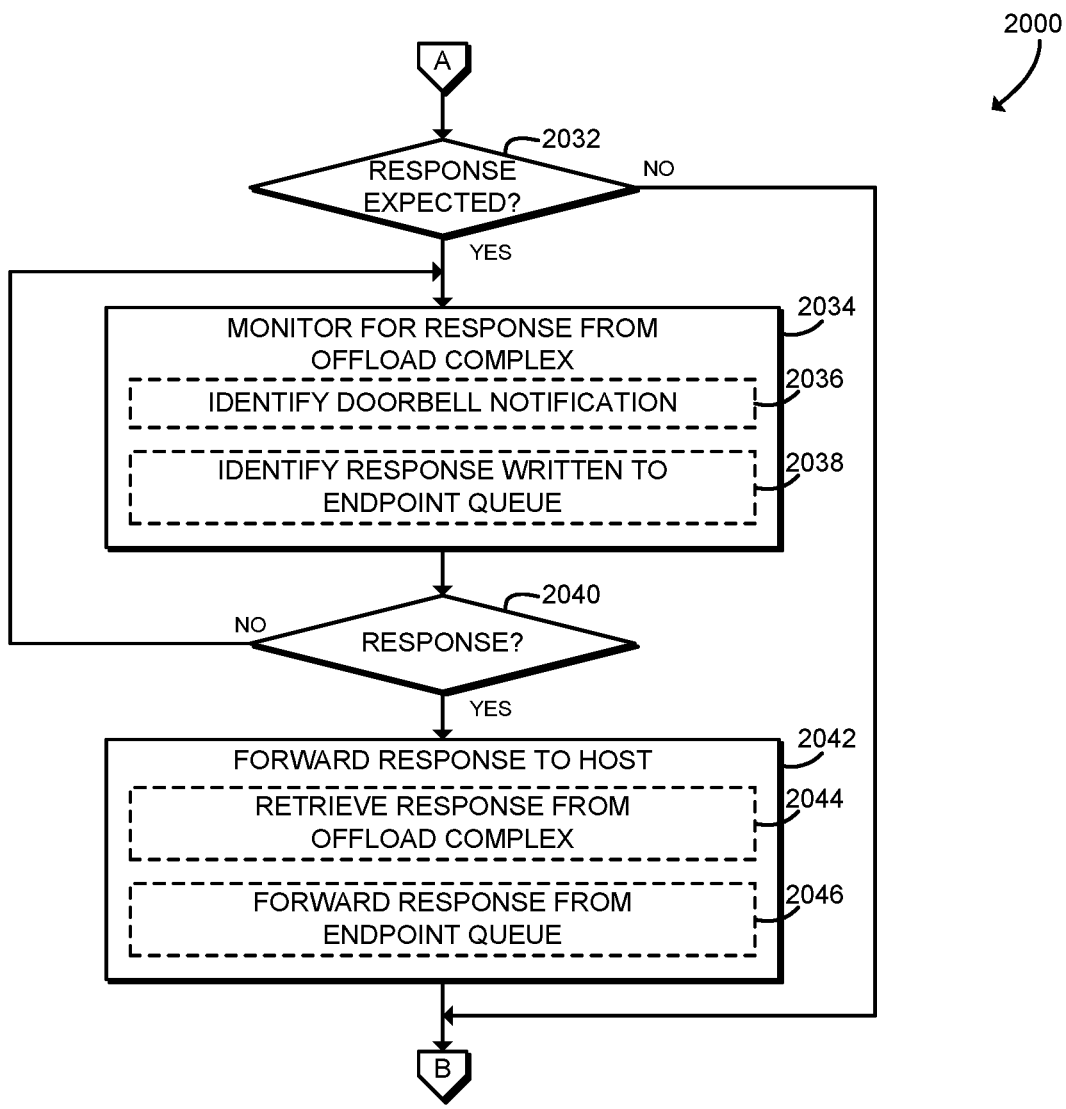

Referring now to FIGS. 20-21, in use, the computing device 1602 may execute a method 2000 for flexible doorbell notification acceleration. It should be appreciated that, in some embodiments, the operations of the method 2000 may be performed by one or more components of the environment 1800 of the computing device 1602 as shown in FIG. 18, such as the smart endpoint 1632. The method 2000 begins in block 2002, in which the smart endpoint 1632 programs endpoint firmware with a protocol parsing configuration. The endpoint firmware may be received from the host using any appropriate technique. For example, the processor 1620 may provision the firmware via the RC 1624 or the firmware may be provisioned out-of-band. The endpoint firmware may be embodied as stored instructions or other data processed by the soft cores 1704 or other programmable elements of the smart endpoint 1632. The endpoint firmware may be stored, for example, in the memory 1708 or other volatile or non-volatile storage of the smart endpoint 1632. As described above, the endpoint firmware may flexibly define protocol parsing and acceleration operations to be performed by the smart endpoint 1632.

In block 2004, the smart endpoint 1632 monitors for transactions from the host on a transaction layer of the I/O interconnect. The transactions may originate, for example, at the root complex 1624 of the computing device 1602. The transactions may be embodied as, for example, PCI Express transaction layer packets (TLP) sent from the host. In block 2006, the smart endpoint 1632 determines whether an I/O transaction has been received. If not, the method 2000 loops back to block 2004 to continue monitoring for I/O transactions. If an I/O transaction is received, the method 2000 advances to block 2008.

In block 2008, the smart endpoint 1632 identifies whether the I/O transaction is a doorbell notification. A doorbell notification may be embodied as any interrupt, register write, or other data sent by the host that indicates that I/O commands are ready in a command queue in the host memory 1626. In some embodiments, in block 2010 the smart endpoint 1632 may identify a change to a command queue tail pointer. For example, the smart endpoint 1632 may identify a write to a particular address associated with a tail pointer register. The address may be in memory space, I/O space, configuration space, or any other address space of the smart endpoint 1632. In block 2012, the smart endpoint 1632 determines whether a doorbell notification was identified. If so, the method 2000 branches to block 2016, described below. If a doorbell notification was not identified, the method 2000 advances to block 2014.

In block 2014, the smart endpoint 1632 passes through the transaction via the endpoint interface 1710 to the offload complex 1634. The smart endpoint 1632 may, for example, pass the transaction as a PCIe TLP to the offload complex 1634. As described above, the offload complex 1634 may process the I/O transaction upon receipt. For example, the offload complex 1634 may execute a storage stack to emulate one or more I/O devices for bare metal virtualization. As part of processing the I/O command, the offload complex 1634 may access remote storage 1640 on one or more remote devices 1604 (e.g., storage sleds or other remote devices). After passing the I/O transaction to the offload complex 1634, the method 2000 loops back to block 2004 to continue monitoring for I/O transactions.

Referring back to block 2012, if a doorbell notification is identified, the method 2000 branches ahead to block 2016, in which the smart endpoint 1632 identifies one or more command locations based on the doorbell value. For example, the smart endpoint 1632 may identify one or more addresses of the I/O command in the host memory 1626 based on the value of a tail pointer register set by the I/O transaction. In block 2018, the smart endpoint 1632 reads the one or more commands from the host memory 1626. The smart endpoint 1632 may read the commands by performing one or more DMA transactions with the DMA engine 1706. The DMA transactions may transfer the I/O command data into a queue in the memory 1708 of the smart endpoint 1632 or, in some embodiments, into a queue in the memory 1716 of the offload complex 1634.

In block 2020, the smart endpoint 1632 identifies one or more blocks, pages, or other ranges of protocol data based on the I/O commands. The protocol data may be described by one or more lists or other data structures included in or otherwise associated with the I/O commands. The smart endpoint 1632 may dereference or otherwise follow multiple chained pointers, descriptors, or other data items to identify the protocol data. For example, in some embodiments in block 2022 the smart endpoint 1632 may parse one or more scatter-gather lists to identify the protocol data. In block 2024, the smart endpoint 1632 reads the protocol data from the host memory 1626. The smart endpoint 1632 may read the protocol data by performing one or more DMA transactions with the DMA engine 1706. The DMA transactions may transfer the protocol data into a buffer in the memory 1708 of the smart endpoint 1632 or, in some embodiments, into a buffer in the memory 1716 of the offload complex 1634.

In block 2026, the smart endpoint 1632 provides the I/O command data and/or the protocol data to the offload complex 1634. The smart endpoint 1632 may provide the data using a push model, a pull model, or any combination of those models. The particular technique used may depend on the I/O protocol and/or the current application. In some embodiments, in block 2028 the smart endpoint 1632 may store the I/O command data and/or the protocol data in the memory 1708 and notify the offload complex 1634. For example, the smart endpoint 1632 may send an interrupt, doorbell notification, or other indication to the offload complex 1634. After the notification, the offload complex 1634 may pull the I/O command data and/or the protocol data from the memory 1708. In some embodiments, in block 2030 the smart endpoint 1632 may store the I/O data and/or the protocol data in the memory 1716 of the offload complex 1634. The smart endpoint 1632 may, for example, write the data into a buffer in the memory 1716 and update one or more associated tail pointers, descriptors, or other data items. Pushing the data to the offload complex 1634 may have lower latency and potentially larger queue sizes as compared to pulling the data from the smart endpoint 1632. However, the push model may require increased complexity for the smart endpoint 1632 as compared to a pull model. After providing data to the offload complex 1634, the method 2000 proceeds to block 2032, shown in FIG. 21.

In block 2032, shown in FIG. 21, the smart endpoint 1632 determines whether a determines whether a response is expected to the I/O command. For example, as described above, certain I/O commands may be posted, for which a response is not expected, or non-posted, for which a response is expected. If no response is expected, the method 2000 loops back to block 2004, shown in FIG. 20, to continue monitoring for I/O transactions. If a response is expected, the method 2000 advances to block 2034.

In block 2034, the smart endpoint 1632 monitors for a response from the offload complex 1634. As describe above, the response may be embodied as one or more I/O completions, I/O transactions, or other responses, and may include status information, protocol data, or other data generated by the offload complex 1634. The smart endpoint 1632 may use any technique to receive the response, including a push model and a pull model. The particular model used may depend on the particular I/O protocol and/or application in use. In some embodiments, in block 2036 the smart endpoint 1632 may identify a doorbell notification from the offload complex 1634. Similar to a doorbell notification from the host, the doorbell notification from the offload complex 1634 may be embodied as any interrupt, register write, or other data sent by the offload complex 1634 that indicates that response data is ready in the memory 1716 of the offload complex 1634. The smart endpoint 1632 may similarly read the response from the memory 1716 using the DMA engine 1706. In some embodiments, in block 2038 the smart endpoint 1632 may identify a response written by the offload complex 1634 directly to a queue or other buffer in the memory 1708 of the smart endpoint 1632. In block 2040, the smart endpoint 1632 determines whether a response has been received. If not, the method 2000 loops back to block 2034 to continue monitoring for a response. If response is received, the method 2000 advances to block 2042.

In block 2042, the smart endpoint 1632 forwards the response to the root complex 1624 of the host. The smart endpoint 1632 forwards the response using a technique specified by the corresponding I/O protocol and/or application. For example, the smart endpoint 632 may forward the response as one or more I/O completions, I/O transactions, interrupts, or other data transfers. The response data itself may be forwarded data of the smart endpoint 1632 or the offload complex 1634. In some embodiments, in block 2044 the smart endpoint 1632 may retrieve the response from the offload complex 1634. For example, the smart endpoint 1632 may perform one or more DMA transactions with the DMA engine 1706 to transfer the response from the offload complex 1634 to the host. In some embodiments, in block 2046 the smart endpoint 1632 may forward the response from a queue or other buffer of the smart endpoint 1632. For example, the smart endpoint 1632 may forward the response data from a buffer in the memory 1708 of the smart endpoint 1632. After forwarding the response, the method 2000 loops back to block 2004, shown in FIG. 20, to continue monitoring for I/O transactions.

EXAMPLES

Illustrative examples of the technologies disclosed herein are provided below. An embodiment of the technologies may include any one or more, and any combination of, the examples described below.

Example 1 includes a smart endpoint for I/O protocol acceleration, the smart endpoint comprising a transaction layer to receive an I/O transaction originating from a root port of a computing device, wherein the smart endpoint is coupled to the root port, and wherein the smart endpoint is further coupled to an offload complex of the computing device; a protocol parser to (i) parse the I/O transaction based on an I/O protocol in response to receipt of the I/O transaction and (ii) identify an I/O command in response to parsing of the I/O transaction; and a protocol accelerator to (i) accelerate the I/O command and (ii) provide a smart context to the offload complex in response to acceleration of the I/O command.

Example 2 includes the subject matter of Example 1, and further including a firmware manager to program endpoint firmware of the smart endpoint, wherein to parse the I/O transaction comprises to parse the I/O transaction based on the endpoint firmware.

Example 3 includes the subject matter of any of Examples 1 and 2, and wherein to accelerate the I/O command comprises to copy the I/O command to a memory of the smart endpoint.

Example 4 includes the subject matter of any of Examples 1-3, and wherein to accelerate the I/O command comprises to copy the I/O command to a memory of the offload complex.

Example 5 includes the subject matter of any of Examples 1-4, and wherein to accelerate the I/O command comprises to identify protocol data associated with the I/O command; and copy the protocol data to a memory of the smart endpoint.

Example 6 includes the subject matter of any of Examples 1-5, and wherein to accelerate the I/O command comprises to identify protocol data associated with the I/O command; and copy the protocol data to a memory of the offload complex.

Example 7 includes the subject matter of any of Examples 1-6, and wherein to provide the smart context comprises to provide a pointer to a location of the I/O command to the offload complex.

Example 8 includes the subject matter of any of Examples 1-7, and wherein to accelerate the I/O command comprises to identify protocol data associated with the I/O command; and to provide the smart context comprises to provide a pointer to a location of the protocol data to the offload complex.

Example 9 includes the subject matter of any of Examples 1-8, and wherein to parse the I/O transaction comprises to determine whether the I/O transaction is a doorbell notification; to identify the I/O command comprises to identify the I/O command in a host memory in response to a determination that the I/O transaction is a doorbell notification; and to accelerate the I/O command comprises to read the I/O command from the host memory.

Example 10 includes the subject matter of any of Examples 1-9, and wherein to determine whether the I/O transaction comprises a doorbell notification comprises to determine whether the I/O transaction comprises a tail pointer update.

Example 11 includes the subject matter of any of Examples 1-10, and wherein to provide the smart context to the offload complex comprises to provide the I/O command to the offload complex.

Example 12 includes the subject matter of any of Examples 1-11, and wherein to accelerate the I/O command further comprises to identify protocol data in the host memory based on the I/O command; and read the protocol data from the host memory.

Example 13 includes the subject matter of any of Examples 1-12, and wherein to identify the protocol data comprises to parse a scatter-gather list of the I/O command.

Example 14 includes the subject matter of any of Examples 1-13, and wherein to provide the smart context to the offload complex comprises to provide the protocol data to the offload complex.

Example 15 includes the subject matter of any of Examples 1-14, and wherein the I/O command comprises an NVMe command, a VIRTIO command, or an AVF command.

Example 16 includes the subject matter of any of Examples 1-15, and wherein the protocol accelerator is further to receive a response to the I/O command from the offload complex in response to providing of the smart context to the offload complex; and the transaction layer is further to forward the response to the root complex in response to receipt of the response.

Example 17 includes the subject matter of any of Examples 1-16, and wherein to receive the response comprises to receive a doorbell notification from the offload complex; and read the response from the offload complex in response to receipt of the doorbell notification.

Example 18 includes a method for I/O protocol acceleration, the method comprising receiving, by a smart endpoint of a computing device, an I/O transaction originating from a root port of the computing device, wherein the smart endpoint is coupled to the root port, and wherein the smart endpoint is further coupled to an offload complex of the computing device; parsing, by the smart endpoint, the I/O transaction based on an I/O protocol in response to receiving the I/O transaction; identifying, by the smart endpoint, an I/O command in response to parsing the I/O transaction; accelerating, by the smart endpoint, the I/O command; and providing, by the smart endpoint, a smart context to the offload complex in response to accelerating the I/O command.

Example 19 includes the subject matter of Example 18, and further including programming, by the computing device, endpoint firmware of the smart endpoint, wherein parsing the I/O transaction comprises parsing the I/O transaction based on the endpoint firmware.

Example 20 includes the subject matter of any of Examples 18 and 19, and wherein accelerating the I/O command comprises copying the I/O command to a memory of the smart endpoint.

Example 21 includes the subject matter of any of Examples 18-20, and wherein accelerating the I/O command comprises copying the I/O command to a memory of the offload complex.

Example 22 includes the subject matter of any of Examples 18-21, and wherein accelerating the I/O command comprises identifying protocol data associated with the I/O command; and copying the protocol data to a memory of the smart endpoint.

Example 23 includes the subject matter of any of Examples 18-22, and wherein accelerating the I/O command comprises identifying protocol data associated with the I/O command; and copying the protocol data to a memory of the offload complex.

Example 24 includes the subject matter of any of Examples 18-23, and wherein providing the smart context comprises providing a pointer to a location of the I/O command to the offload complex.

Example 25 includes the subject matter of any of Examples 18-24, and wherein accelerating the I/O command comprises identifying protocol data associated with the I/O command; and providing the smart context comprises providing a pointer to a location of the protocol data to the offload complex.

Example 26 includes the subject matter of any of Examples 18-25, and wherein parsing the I/O transaction comprises determining whether the I/O transaction is a doorbell notification; identifying the I/O command comprises identifying the I/O command in a host memory in response to determining that the I/O transaction is a doorbell notification; and accelerating the I/O command comprises reading the I/O command from the host memory.

Example 27 includes the subject matter of any of Examples 18-26, and wherein determining whether the I/O transaction comprises a doorbell notification comprises determining whether the I/O transaction comprises a tail pointer update.

Example 28 includes the subject matter of any of Examples 18-27, and wherein providing the smart context to the offload complex comprises providing the I/O command to the offload complex.

Example 29 includes the subject matter of any of Examples 18-28, and wherein accelerating the I/O command further comprises identifying protocol data in the host memory based on the I/O command; and reading the protocol data from the host memory.

Example 30 includes the subject matter of any of Examples 18-29, and wherein identifying the protocol data comprises parsing a scatter-gather list of the I/O command.

Example 31 includes the subject matter of any of Examples 18-30, and wherein providing the smart context to the offload complex comprises providing the protocol data to the offload complex.

Example 32 includes the subject matter of any of Examples 18-31, and wherein the I/O command comprises an NVMe command, a VIRTIO command, or an AVF command.

Example 33 includes the subject matter of any of Examples 18-32, and further including receiving, by the smart endpoint, a response to the I/O command from the offload complex in response to providing the smart context to the offload complex; and forwarding, by the smart endpoint, the response to the root complex in response to receiving the response.

Example 34 includes the subject matter of any of Examples 18-33, and wherein receiving the response comprises receiving a doorbell notification from the offload complex; and reading the response from the offload complex in response to receiving the doorbell notification.

Example 35 includes a computing device comprising a processor; and a memory having stored therein a plurality of instructions that when executed by the processor cause the computing device to perform the method of any of Examples 18-34.

Example 36 includes one or more non-transitory, computer readable storage media comprising a plurality of instructions stored thereon that in response to being executed result in a computing device performing the method of any of Examples 18-34.

Example 37 includes a computing device comprising means for performing the method of any of Examples 18-34.

The invention claimed is:

1. A smart endpoint for I/O protocol acceleration, the smart endpoint comprising:
  a transaction layer to receive an I/O transaction originating from a root port of a computing device, wherein the smart endpoint is coupled to the root port, and wherein the smart endpoint is further coupled to an offload complex of the computing device;
  a protocol parser to (i) parse the I/O transaction based on an I/O protocol in response to receipt of the I/O transaction and (ii) identify an I/O command in response to parsing of the I/O transaction; and
  a protocol accelerator to (i) accelerate the I/O command and (ii) provide a smart context to the offload complex in response to acceleration of the I/O command.

2. The smart endpoint of claim 1, further comprising a firmware manager to program endpoint firmware of the smart endpoint, wherein to parse the I/O transaction comprises to parse the I/O transaction based on the endpoint firmware.

3. The smart endpoint of claim 1, wherein to accelerate the I/O command comprises to copy the I/O command to a memory of the smart endpoint.

4. The smart endpoint of claim 1, wherein to accelerate the I/O command comprises to copy the I/O command to a memory of the offload complex.

5. The smart endpoint of claim 1, wherein to accelerate the I/O command comprises to:
  identify protocol data associated with the I/O command; and
  copy the protocol data to a memory of the smart endpoint.

6. The smart endpoint of claim 1, wherein to accelerate the I/O command comprises to:
  identify protocol data associated with the I/O command; and
  copy the protocol data to a memory of the offload complex.

7. The smart endpoint of claim 1, wherein:
  to parse the I/O transaction comprises to determine whether the I/O transaction is a doorbell notification;
  to identify the I/O command comprises to identify the I/O command in a host memory in response to a determination that the I/O transaction is a doorbell notification; and
  to accelerate the I/O command comprises to read the I/O command from the host memory.

8. The smart endpoint of claim 7, wherein to determine whether the I/O transaction comprises a doorbell notification comprises to determine whether the I/O transaction comprises a tail pointer update.

9. The smart endpoint of claim 7, wherein to provide the smart context to the offload complex comprises to provide the I/O command to the offload complex.

10. The smart endpoint of claim 7, wherein to accelerate the I/O command further comprises to:
identify protocol data in the host memory based on the I/O command; and
read the protocol data from the host memory.

11. The smart endpoint of claim 10, wherein to provide the smart context to the offload complex comprises to provide the protocol data to the offload complex.

12. The smart endpoint of claim 1, wherein:
the protocol accelerator is further to receive a response to the I/O command from the offload complex in response to providing the smart context to the offload complex; and
the transaction layer is further to forward the response to the root complex in response to receipt of the response.

13. The smart endpoint of claim 12, wherein to receive the response comprises to:
receive a doorbell notification from the offload complex; and
read the response from the offload complex in response to receipt of the doorbell notification.

14. A method for I/O protocol acceleration, the method comprising:
receiving, by a smart endpoint of a computing device, an I/O transaction originating from a root port of the computing device, wherein the smart endpoint is coupled to the root port, and wherein the smart endpoint is further coupled to an offload complex of the computing device;
parsing, by the smart endpoint, the I/O transaction based on an I/O protocol in response to receiving the I/O transaction;
identifying, by the smart endpoint, an I/O command in response to parsing the I/O transaction;
accelerating, by the smart endpoint, the I/O command; and
providing, by the smart endpoint, a smart context to the offload complex in response to accelerating the I/O command.

15. The method of claim 14, further comprising programming, by the computing device, endpoint firmware of the smart endpoint, wherein parsing the I/O transaction comprises parsing the I/O transaction based on the endpoint firmware.

16. The method of claim 14, wherein:
parsing the I/O transaction comprises determining whether the I/O transaction is a doorbell notification;
identifying the I/O command comprises identifying the I/O command in a host memory in response to determining that the I/O transaction is a doorbell notification; and
accelerating the I/O command comprises reading the I/O command from the host memory.

17. The method of claim 16, wherein providing the smart context to the offload complex comprises providing the I/O command to the offload complex.

18. The method of claim 16, wherein accelerating the I/O command further comprises:
identifying protocol data in the host memory based on the I/O command; and
reading the protocol data from the host memory.

19. The method of claim 18, wherein providing the smart context to the offload complex comprises providing the protocol data to the offload complex.

20. One or more computer-readable storage media comprising a plurality of instructions stored thereon that, in response to being executed, cause a computing device to:
receive, by a smart endpoint of the computing device, an I/O transaction originating from a root port of the computing device, wherein the smart endpoint is coupled to the root port, and wherein the smart endpoint is further coupled to an offload complex of the computing device;
parse, by the smart endpoint, the I/O transaction based on an I/O protocol in response to receiving the I/O transaction;
identify, by the smart endpoint, an I/O command in response to parsing the I/O transaction;
accelerate, by the smart endpoint, the I/O command; and
provide, by the smart endpoint, a smart context to the offload complex in response to accelerating the I/O command.

21. The one or more computer-readable storage media of claim 20, further comprising a plurality of instructions stored thereon that, in response to being executed, cause the computing device to program endpoint firmware of the smart endpoint, wherein to parse the I/O transaction comprises to parse the I/O transaction based on the endpoint firmware.

22. The one or more computer-readable storage media of claim 20, wherein:
to parse the I/O transaction comprises to determine whether the I/O transaction is a doorbell notification;
to identify the I/O command comprises to identify the I/O command in a host memory in response to determining that the I/O transaction is a doorbell notification; and
to accelerate the I/O command comprises to read the I/O command from the host memory.

23. The one or more computer-readable storage media of claim 22, wherein to provide the smart context to the offload complex comprises to provide the I/O command to the offload complex.

24. The one or more computer-readable storage media of claim 22, wherein to accelerate the I/O command further comprises to:
identify protocol data in the host memory based on the I/O command; and
read the protocol data from the host memory.

25. The one or more computer-readable storage media of claim 24, wherein to provide the smart context to the offload complex comprises to provide the protocol data to the offload complex.

* * * * *